(12) United States Patent
Chen et al.

(10) Patent No.: US 12,548,297 B2
(45) Date of Patent: Feb. 10, 2026

(54) IMAGE PROCESSING METHOD AND APPARATUS, COMPUTER DEVICE, STORAGE MEDIUM, AND PROGRAM PRODUCT BASED ON FEATURE AND DISTRIBUTION CORRELATION

(71) Applicant: Tencent Technology (Shenzhen) Company Limited, Guangdong (CN)

(72) Inventors: Jiawei Chen, Guangdong (CN); Yuexiang Li, Guangdong (CN); Kai Ma, Guangdong (CN); Yefeng Zheng, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 667 days.

(21) Appl. No.: 17/976,971

(22) Filed: Oct. 31, 2022

(65) Prior Publication Data

US 2023/0051411 A1    Feb. 16, 2023

Related U.S. Application Data

(63) Continuation of application No. PCT/CN2022/072987, filed on Jan. 20, 2022.

(30) Foreign Application Priority Data

Feb. 4, 2021 (CN) .......................... 202110154129.8

(51) Int. Cl.
*G06V 10/774* (2022.01)
*G06V 10/74* (2022.01)
*G06V 10/82* (2022.01)

(52) U.S. Cl.
CPC .......... *G06V 10/774* (2022.01); *G06V 10/761* (2022.01); *G06V 10/82* (2022.01)

(58) Field of Classification Search
None
See application file for complete search history.

(56) References Cited

U.S. PATENT DOCUMENTS 8,818,109 B2 *   8/2014   Kisilev .................. G06V 10/30
                                                        382/172
9,818,136 B1 *  11/2017   Hoffberg ............... G07F 17/323
                       (Continued)

FOREIGN PATENT DOCUMENTS

CN   102402621 A    4/2012
CN   105427264 A    3/2016
       (Continued)

OTHER PUBLICATIONS

Office Action issued in Chinese Patent Application No. 202110154129.8 dated May 1, 2025, w/English translation, 16 pages.
(Continued)

*Primary Examiner* — Tahmina N Ansari
(74) *Attorney, Agent, or Firm* — Crowell & Moring LLP

(57) ABSTRACT

Methods and apparatuses for image processing are provided. A first image belonging to a first image domain is acquired and input to an image processing model to be trained to obtain a second image belonging to a second image domain. A first correlation degree between an image feature of the first image and an image feature of the second image to obtain a target feature correlation degree is calculated. A second correlation degree between feature value distribution of the image feature of the first image and feature value distribution of the image feature of the second image is calculated to obtain a distribution correlation degree. Model parameters of an image processing model are adjusted to a direction in which the target feature correlation degree is increased and a direction in which the distribution correlation degree is increased to obtain a trained image processing.

19 Claims, 7 Drawing Sheets

(56) References Cited

U.S. PATENT DOCUMENTS

| | | | |
|---|---|---|---|
| 10,943,273 B2* | 3/2021 | Hoffberg | G06Q 30/0207 |
| 11,790,413 B2* | 10/2023 | Hoffberg | G07F 17/323 |
| | | | 705/14.1 |
| 2008/0008396 A1* | 1/2008 | Kisilev | G06V 10/30 |
| | | | 382/223 |
| 2014/0126839 A1* | 5/2014 | Qin | G06T 3/14 |
| | | | 382/294 |
| 2022/0245804 A1* | 8/2022 | Ishikawa | G06T 7/0014 |
| 2023/0051411 A1* | 2/2023 | Chen | G06V 10/82 |
| 2023/0401274 A1* | 12/2023 | Denninghoff | G06Q 30/0251 |
| 2024/0296528 A1* | 9/2024 | Xiao | G06T 5/60 |

FOREIGN PATENT DOCUMENTS

| | | |
|---|---|---|
| CN | 109727264 A | 5/2019 |
| CN | 109961102 A | 7/2019 |
| CN | 110852940 A | 2/2020 |
| CN | 111583165 A | 8/2020 |
| CN | 111652830 A | 9/2020 |
| CN | 112116684 A | 12/2020 |
| CN | 113570497 A | 10/2021 |
| WO | WO 2020168844 A1 | 8/2020 |

OTHER PUBLICATIONS

Pang Weiyun, "Deep Learning Based Optimization Method for Image Style Migration" University of Electronic Science and Technology, Aug. 2020, w/English translation, 142 pages.

Office Action issued on European application 22748883.0 on Apr. 2, 2024, 14 pages.

Ulyanov, Dimitry et al., "Instance Normalization: The Missing Ingredient for Fast Stylization", https://github.com/DmitryUlyanov/texture_nets (2016).

Xie, Xinpeng et al., "MI$^2$GAN: Generative Adversarial Network for Medical Image Domain Adaptation Using Mutual Information Constraint", Computer Vision Institute, Shenzhen University, Shenzhen, China; Tencent Jarvis Lab, Shenzhen, China, MICCAI 2020.

Zhang, Tianyang et al., "Noise Adaptation Generative Adversarial Network for Medical Image Analysis", IEEE Transactions on Medical Imaging, vol. 39, No. 4, Apr. 2020.

International Search Report (PCT/ISA/210) issued in PCT Application No. PCT/CN2022/072987 dated Apr. 19, 2022 with English translation (four (4) pages).

Chinese-language Written Opinion (PCT/ISA/237) issued in PCT Application No. PCT/CN2022/072987 dated Apr. 19, 2022 (four (4) pages).

* cited by examiner

IMAGE PROCESSING METHOD AND APPARATUS, COMPUTER DEVICE, STORAGE MEDIUM, AND PROGRAM PRODUCT BASED ON FEATURE AND DISTRIBUTION CORRELATION

RELATED APPLICATION

This application is a continuation of PCT application PCT/CN2022/072987 filed Jan. 20, 2022, which claims priority to Chinese Patent Application No. 202110154129.8, filed with the Chinese Patent Office on Feb. 4, 2021 and entitled "IMAGE PROCESSING METHOD AND APPARATUS, COMPUTER DEVICE, AND STORAGE MEDIUM", which is incorporated herein by reference in its entirety.

TECHNICAL FIELD

The present subject matter relates to the technical field of image processing, and in particular, to an image processing method and apparatus, a computer device, a non-transitory storage medium, and a program product.

BACKGROUND

With the development of artificial intelligence and multimedia technologies, there are more and more scenes in which users use image information in daily life and production activities. For example, users can perform domain conversion on images to obtain images in different image domains. For example, a sketch image can be converted into a two-dimensional image.

Currently, an image can be processed by artificial intelligence and using a machine learning model, and the image is input to the model to obtain a processed image; however, there is often a situation that the content of the processed image greatly changes from the content of the image which may not be processed, for example, the converted image may be distorted, resulting in a poor image processing effect.

BRIEF SUMMARY

According to various examples provided in the present subject matter, an image processing method and apparatus, a computer device, a non-transitory storage medium and a program product are provided.

An image processing method is performed by a computer device, the method includes: acquiring a first image belonging to a first image domain, and inputting the first image to an image processing model to be trained to obtain a second image belonging to a second image domain; performing feature extraction on the first image to obtain a first image feature; performing feature extraction on the second image to obtain a second image feature; calculating a correlation degree between the first image feature and the second image feature to obtain a target feature correlation degree, the target feature correlation degree being used for characterizing the degree of similarity between the first image feature and the second image feature in content information; acquiring feature value distribution of the first image feature to obtain first feature value distribution, and acquiring feature value distribution of the second image feature to obtain second feature value distribution; calculating a correlation degree between the first feature value distribution and the second feature value distribution to obtain a distribution correlation degree, and the amount of image domain information contained in the first image feature and the second image feature is in negative correlation with the distribution correlation degree; and adjusting model parameters of the image processing model to a direction in which the target feature correlation degree is increased and a direction in which the distribution correlation degree is increased to obtain a trained image processing model, so that an image is processed using the trained image processing model.

Provided is an image processing apparatus, the apparatus includes: an image acquisition module configured to acquire a first image belonging to a first image domain, and input the first image to an image processing model to be trained to obtain a second image belonging to a second image domain; an image feature extraction module configured to perform feature extraction on the first image to obtain a first image feature; and perform feature extraction on the second image to obtain a second image feature; a target feature correlation degree obtaining module configured to calculate a correlation degree between the first image feature and the second image feature to obtain a target feature correlation degree, the target feature correlation degree being used for characterizing the degree of similarity between the first image feature and the second image feature in content information; a feature value distribution acquisition module configured to acquire feature value distribution of the first image feature to obtain first feature value distribution, and acquire feature value distribution of the second image feature to obtain second feature value distribution; a distribution correlation degree obtaining module configured to calculate a correlation degree between the first feature value distribution and the second feature value distribution to obtain a distribution correlation degree, the amount of image domain information contained in the first image feature and the second image feature being in negative correlation with the distribution correlation degree; and a trained image processing model obtaining module configured to adjust model parameters of the image processing model to a direction in which the target feature correlation degree is increased and a direction in which the distribution correlation degree is increased to obtain a trained image processing model, so that an image is processed using the trained image processing model.

A computer device is provided, including a memory and one or more processors, the memory storing computer-readable instructions, the computer-readable instructions, when executed by the one or more processors, causing the one or more processors to perform the steps of the image processing method described above.

One or more non-volatile computer-readable storage media are provided, storing computer-readable instructions, the computer-readable instructions, when executed by one or more processors, causing the one or more processors to perform the steps of the image processing method described above. A computer program product, including computer-readable instructions, the computer-readable instructions, when executed by a processor, implementing the steps of the image processing method.

An image processing method is performed by a computer device, the method includes: acquiring an original image to be style-migrated; determining a first image domain to which the original image belongs and a second image domain to which the original image is to be migrated; determining a trained image processing model based on the first image domain and the second image domain; the image processing model being obtained by adjusting model parameters of an image processing model to be trained to a direction in which a target feature correlation degree is increased and a direction in which a distribution correlation degree is increased, the target feature correlation degree being a correlation degree between a first image feature and a second image feature, the distribution correlation degree being a correlation degree between feature value distribution of the first image feature and feature value distribution of the second image feature, the target feature correlation degree being used for characterizing the degree of similarity between the first image feature and the second image feature in content information, and the amount of image domain information contained in the first image feature and the second image feature being in negative correlation with the distribution correlation degree; the first image feature being an image feature of a first image belonging to the first image domain, the second image feature being an image feature of a second image belonging to the second image domain, and the second image being generated based on the first image; and inputting the original image to a trained image processing model to generate a target image in a second image domain.

Provided is an image processing apparatus, the apparatus includes: an original image acquisition module configured to acquire an original image to be style-migrated; an image domain determination module configured to determine a first image domain to which the original image belongs and a second image domain to which the original image is to be migrated; a trained image processing model determination module configured to determine a trained image processing model based on the first image domain and the second image domain; the image processing model being obtained by adjusting model parameters of an image processing model to be trained to a direction in which a target feature correlation degree is increased and a direction in which a distribution correlation degree is increased, the target feature correlation degree being a correlation degree between a first image feature and a second image feature, the distribution correlation degree being a correlation degree between feature value distribution of the first image feature and feature value distribution of the second image feature, the target feature correlation degree being used for characterizing the degree of similarity between the first image feature and the second image feature in content information, and the amount of image domain information contained in the first image feature and the second image feature being in negative correlation with the distribution correlation degree; the first image feature being an image feature of a first image belonging to the first image domain, the second image feature being an image feature of a second image belonging to the second image domain, and the second image being generated based on the first image; and a target image generation module configured to input the original image to the trained image processing model to generate a target image in a second image domain.

A computer device is provided, including a memory and one or more processors, the memory storing computer-readable instructions, the computer-readable instructions, when executed by the one or more processors, causing the one or more processors to perform the steps of the image processing method described above.

One or more non-volatile computer-readable storage media are provided, storing computer-readable instructions, the computer-readable instructions, when executed by one or more processors, causing the one or more processors to perform the steps of the image processing method described above.

A computer program product, including computer-readable instructions, the computer-readable instructions, when executed by the processor, implementing the foregoing image processing method.

Details of one or more examples of the present subject matter are provided in the accompany drawings and descriptions below. Other features, objectives, and advantages of the present subject matter become obvious with reference to the specification, the accompanying drawings, and the claims.

BRIEF DESCRIPTION OF THE DRAWINGS

To describe the technical solutions in the examples of the present subject matter more clearly, the following briefly introduces the accompanying drawings required for describing the examples. Apparently, the accompanying drawings in the following description show merely some examples of the present subject matter, and a person of ordinary skill in the art may still derive other drawings from these accompanying drawings without creative efforts.

DETAILED DESCRIPTION

To make objectives, technical solutions, and advantages of the present subject matter clearer and more understandable, the present subject matter is further described in detail below with reference to the accompanying drawings and the examples. The specific examples described herein are only used for explaining the present subject matter, and may not be used for limiting the present subject matter.

Figure 1:
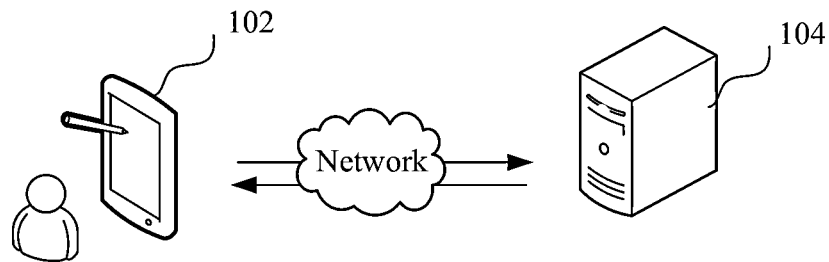
FIG. 1 is a diagram of an application environment of an image processing method in some examples.

An image processing method provided in the present subject matter may be applied to an application environment shown in FIG. 1. A terminal 102 communicates with a server 104 through a network. The terminal 102 may send an image domain migration request to the server 104, wherein the image domain migration request may carry an original image, a first image domain to which the original image belongs and a second image domain to which the original image is to be migrated, the server 104 may acquire a trained image processing model according to the first image domain and the second image domain, and the image processing model is used for performing image domain migration on an image in the first image domain to obtain an image in the second image domain. The server 104 may input the original image to the image processing model to generate a target image in the second image domain. The server 104 may return the generated target image to the terminal 102 or other terminals.

The image processing model may be trained by the server 104. Specifically, the server 104 may obtain a first image belonging to the first image domain, input the first image to an image processing model to be trained to obtain a second image belonging to the second image domain, perform feature extraction on the first image to obtain a first image feature, perform feature extraction on the second image to obtain a second image feature, calculate a correlation degree between the first image feature and the second image feature to obtain a target feature correlation degree, obtain a first model loss value based on the target feature correlation degree, the first model loss value being in negative correlation with the target feature correlation degree, acquire feature value distribution of the first image feature to obtain first feature value distribution, acquire feature value distribution of the second image feature to obtain second feature value distribution, calculate a correlation degree between the first feature value distribution and the second feature value distribution to obtain a distribution correlation degree, obtain a second model loss value based on the distribution correlation degree, the second model loss value being in negative correlation with the distribution correlation degree, obtain a target model loss value based on the first model loss value and the second model loss value, and adjust model parameters of the image processing model based on the target model loss value to obtain a trained image processing model, so that an image is processed using the trained image processing model. The target feature correlation degree is used for characterizing the degree of similarity between the first image feature and the second image feature in content information; and the amount of image domain information contained in the first image feature and the second image feature is in negative correlation with the distribution correlation degree, and the model parameters of the image processing model may be adjusted to a direction in which the target feature correlation degree is increased and the direction in which the distribution correlation degree is increased to obtain the trained image processing model.

The terminal 102 may be, but may not be limited to, various personal computers, notebook computers, smart phones, tablet computers, and portable wearable devices. The server 104 may be an independent physical server, may be a server cluster or a distributed system composed of a plurality of physical servers, and can also be a cloud server providing basic cloud computing service such as cloud storage, network service, cloud communication, big data and artificial intelligent platforms. The terminal and the server may be directly or indirectly connected in a wired or wireless communication manner. This is not limited in this application.

It can be understood that the image processing model provided in the examples of the present subject matter may also be deployed in the terminal 102.

Figure 2:
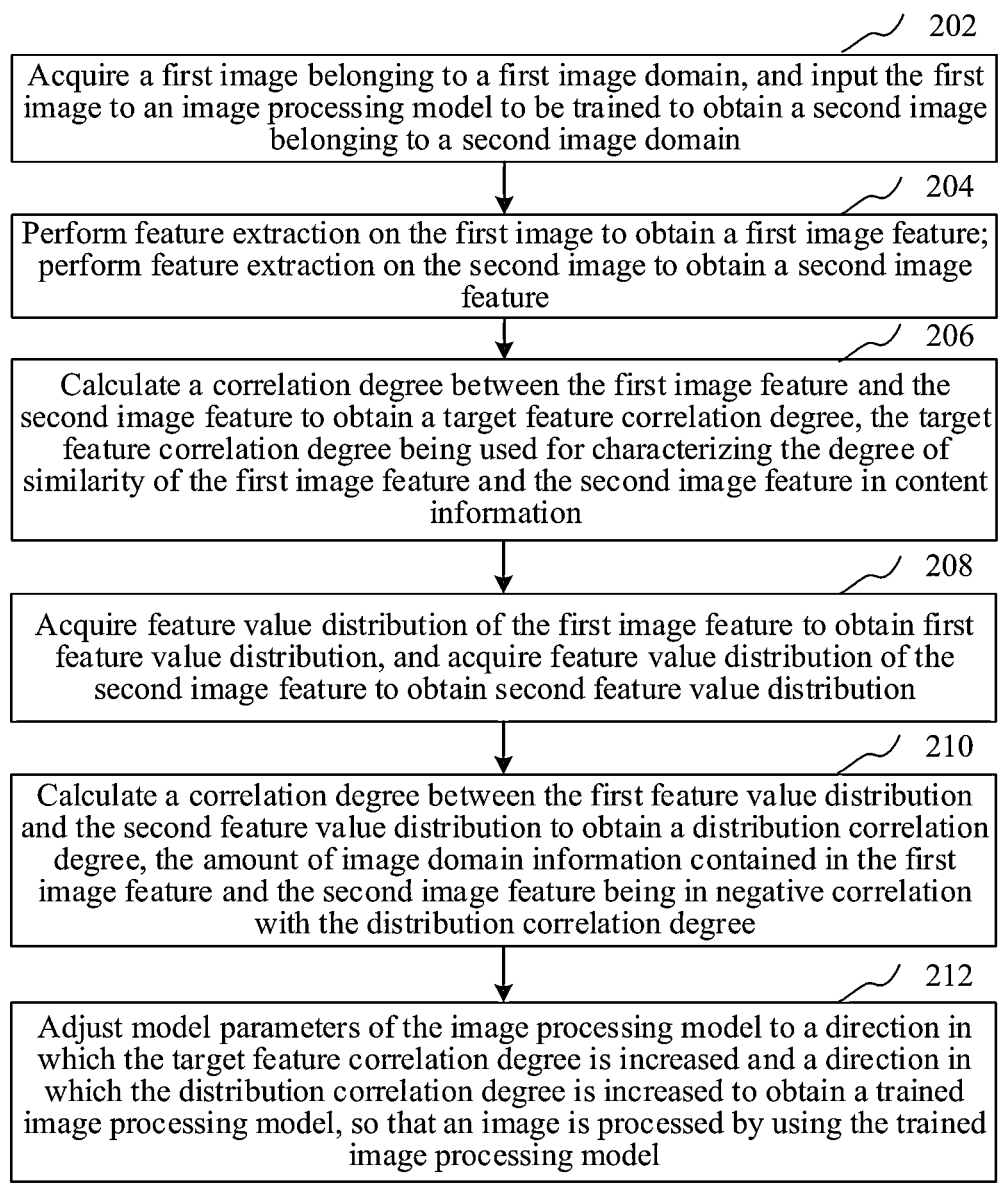
FIG. 2 is a schematic flowchart of an image processing method in some examples.

In some examples, as shown in FIG. 2, an image processing method is provided, and the method is described by way of an example in which the method is applied to the server 104 in FIG. 1, and may include the following steps.

Step 202, a first image belonging to a first image domain is acquired, and the first image is input to an image processing model to be trained to obtain a second image belonging to a second image domain.

An image domain refers to a domain to which an image belongs. The domain may be divided according to image domain information. Images in the same domain have the same image domain information. The image domain information may include information reflecting the styles of the images, including, but not limited to a color or brightness. Images in different domains may be acquired by different image acquisition devices or different image acquisition personnel, for example, images acquired by one image acquisition device correspond to one domain, or images acquired using different acquisition parameters correspond to one image domain.

The first image domain and the second image domain may be two different image domains, the first image domain may also be referred to as a source domain, and the second image domain may also be referred to as a target domain. The source domain refers to an image domain to which an image belongs before being processed by an image processing model. The target domain refers to an image domain to which an image belongs after being processed by the image processing model. The first image belongs to the first image domain, and there may be a plurality of first images. The second image belongs to the second image domain and is generated by the image processing model according to the first image.

The image processing model is used for processing the image. For example, image processing may be at least one of image enhancement and image conversion. The image conversion may be image cross-domain conversion which means that an image is converted from the source domain to the target domain. The image cross-domain conversion may be the conversion of an image from one source (source domain) into an image meeting a standard of another source (target domain), for example, image style conversion may be performed to convert an image from one style to another style. The image processing model may be a fully convolutional network (FCN) model. The FCN entirely consists of a convolutional layer and a pooling layer. The image cross-domain conversion is an image domain adaptation method. Image domain adaptation, which may also be referred to as domain adaption (DA), is a method for solving the inconsistency of data distribution between two domains. Generally, images or features in one domain may be converted to another domain to reduce the difference of the images in the two domains.

Specifically, the server may store a plurality of images in the first image domain, acquire the first image from the plurality of images in the first image domain, and input the first image to the image processing model to be trained to obtain the second image in the second image domain. That is, the image processing model to be trained has the capability of converting the image in the first image domain into the image in the second image domain, the image processing model to be trained may be a model which is being trained at the current time; and when the server determines that the training process of the image processing model satisfies an adjustment condition of a preset training manner, the steps that the first image in the first image domain is acquired, and the first image input to the image processing model to be trained to obtain the second image in the second image domain may be performed. The adjustment condition of the preset training manner may include at least one of conditions that the number of training times reaches a preset number and the number of training times or an image output by the image processing model satisfies a preset image condition. The preset image condition may, for example, be that the image content information is kept consistent with the image content information before processing. The image content information may be used for reflecting information of objects in the image, including, but not limited to textures, shapes, or spatial relationships. The object in the image may be an inanimate object or an animate object, the inanimate object may include furniture such as a table or a chair, the animate object may, for example, be a component in a plant, bacterium, animal or human body, the component in the human body may, for example, be a lung, heart or fundus of the human body, or an object, such as a spot in the fundus or a nodule in the lung, in the lung, heart or fundus of the human body. The image content information may, for example, be the position and shape of a plant in the image, for a medical image in the medical field, the image content information may, for example, be the shape of the component of the human body in the medical image, such as the shape of a "lung" in a "lung" image.

Figure 3:
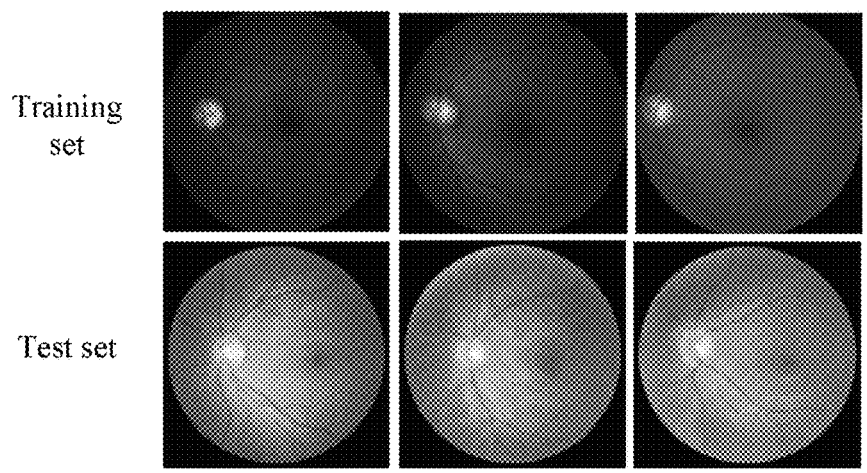
FIG. 3 is a schematic diagram of a first image and a second image in some examples.

In some examples, the first image domain may be an image domain to which a training set for training an image detection model in the medical field belongs, and the second image domain is an image domain to which a test set for testing the image detection model belongs. The image detection model is a model for detecting an image and is used for obtaining an image detection result, and the image detection result may, for example, be a detection result of an object in the image, for example, including at least one of a position where the object is located and a classification result corresponding to the object. For example, an image recognition model may perform recognition to obtain at least one of the position and class of a spot in the fundus. The training set may include a plurality of medical images, the test set may include a plurality of medical images, and the training set and the test set can be acquired by different medical devices and belong to different image domains. The image domain to which each medical image in the training set belongs may be the same, the image domain to which each medical image in the test set belongs may be the same, and the image domains to which the medical images in the training set and the medical images in the test set belong may be different. When a neural network model may be trained, if the training set and the test set belong to different image domains, in order to improve the accuracy of training, the images in the test set can be converted into the image domain to which the training set belongs. For example, the first image domain may, for example, be an image domain to which a test set in a REFUGE data set belongs, and the second image domain may, for example, be an image domain to which a training set in the REFUGE data set belongs. The REFUGE data set consists of 1200 fundus images that can be used for optic disc (OD) and optic cup (OC) segmentation. The training set and the test set in the REFUGE data set may be respectively acquired by different fundus cameras; as shown in FIG. 3, the fundus images in the first row may be the images in the training set, and the fundus images in the second row may be the images in the test set; it can be seen from the figure that there may be an obvious visual difference of the fundus images in the training set and the fundus images in the test set, the fundus images in the training set may be darker, and the fundus images in the test set may be lighter; and it can be clearly seen that the image domains to which the fundus images in the training set and the fundus images in the test set belong may be different.

In some examples, the image processing model may be used for mode conversion of an image, and the mode may be determined according to the attribute of the image. For example, the attribute of the image may include an image style. The image may be converted from a source style to a target style using the image processing model. The image style may include at least one of a cartoon style, a real style, a sketch style, a caricature style, and a two-dimensional style. For example, the image processing model may be used for converting a sketch image into an image of the two-dimensional style.

In some examples, the goal of the image processing model may be to reduce content changes of the image when it may be processed, i.e. to ensure the invariance of the image content information. For example, if a day image may be to be converted into a night image, and an image acquired by a hospital A may be converted into an image acquired by a hospital B, it may be necessary to ensure that the content changes of the converted image may be as little as possible so as to reduce the occurrence of great changes in the image content information after image processing.

In some examples, the image processing model may be a generative adversarial network (GAN) model such as any generative network model in a cycle-consistent adversarial network (cycleGAN). The CycleGAN may be a network framework for solving the task of unpaired image conversion. The generative adversarial network may include a generative network model and a discrimination network model. The generative adversarial network learns by mutual gaming between the generative network model and the discrimination network model to obtain a desired machine learning model. The goal of the generative network model may be to obtain a desired output according to an input, and the goal of the discrimination network model may be to distinguish the output of the generative network model from a real image as much as possible, and the input of the discrimination network model may include the output of the generative network model and the real image. The two network models learn against each other and continuously adjust parameters, for which the ultimate goal may be that the generative network model may be to deceive the discrimination network model as much as possible, and the discrimination network model may not judge whether the output result of the generative network model may be real. The generative network model may also be referred to as a generator, and the discrimination network model may also be referred to as a discriminator. The CycleGAN may include two unidirectional GAN networks, the two unidirectional GAN networks share the generative network model, and each has a discrimination network model, that is, the CycleGAN may include two generative network models and two discrimination network models. The image processing model may, for example, be a generator $G_{AB}$ in FIG. 4 or FIG. 5, or a generator $G_{BA}$ in FIG. 5. A generator $G_{AB}$ and a discriminator $D_B$ in FIG. 4 form the GAN. A generator $G_{AB}$, a generator $G_{BA}$, a discriminator $D_A$ and a discriminator $D_B$ in FIG. 5 form the CycleGAN, and cross-domain image migration can be realized by a generator $G_{AB}$, a generator $G_{BA}$, a discriminator $D_A$ and a discriminator $D_B$. For example, a first image Ia in the first image domain may be input to a generator $G_{BA}$ to obtain a second image Iab in the second image domain. Backbones (backbone networks) of a generator $G_{AB}$, a generator $G_{BA}$, a discriminator $D_A$ and a discriminator $D_B$ can be chosen freely and can be adjusted to the most suitable models for the data.

In some examples, the image processing model to be trained may be a model that may not be trained at all, or may be a model that may be trained and may be required to be further optimized. For example, when the image processing model may be the generative network model of the Cycle-GAN, a traditional training method can be used for training the CycleGAN; however, using the traditional training method, an image generated by the generative network model in the CycleGAN easily deforms, and therefore, the model parameters need to be further adjusted to reduce the situation that the generated image deforms. Therefore, the image processing method provided in the example of the present subject matter can be used for training the model. The model parameters refer to variable parameters inside the model, and the neural network model may also be referred to as a neural network weight.

In some examples, the server may firstly perform training using an individual training method such as a traditional method to obtain a converged CycleGAN model, and then train the generative network model in the CycleGAN using the image processing method provided in the example of the present subject matter. The server may also train the Cycle-GAN using a method combining a traditional training method with the image processing method provided in the example of the present subject matter, or in an alternating manner, for example, firstly, the CycleGAN may be trained for a first preset number of times (for example, once) using the traditional method, then the generative network model in the CycleGAN may be trained for a second preset number of times (for example, once) using the joint training method provided in the example of the present subject matter, and thus, one round of training may be completed; and then, the next round of training may be performed.

Step 204, feature extraction may be performed on the first image to obtain a first image feature; and feature extraction may be performed on the second image to obtain a second image feature.

The first image feature may be a feature obtained by performing feature extraction on the first image, and the second image feature may be a feature obtained by performing feature extraction on the second image. The image feature may include an image content feature, and may further include an image domain feature, the image content feature may be a feature corresponding to the image content information and may, for example, be a texture feature, and the image domain feature refers to a feature corresponding to image domain information and may, for example, be a brightness feature.

Specifically, the server may perform feature extraction on the first image by means of a first encoding model to obtain the first image feature, and perform feature extraction on the second image through a second encoding model to obtain the second image feature. The first encoding model and the second encoding model can be obtained by joint training, for example, a model loss value can be obtained by performing calculation according to the first image feature output by the first encoding model and the second image feature output by the second encoding model, and model parameters of the first encoding model and the second encoding model may be adjusted according to the model loss value. The loss value may be obtained according to a loss function which may be a function used for representing a "risk" or "loss" of an event. The first encoding model and the second encoding model may be the same or different, and the encoding models may be convolutional neural network models.

Figure 4:
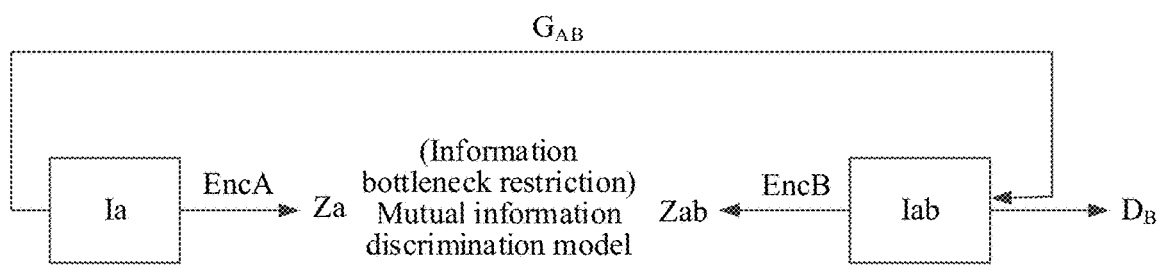
FIG. 4 is a structural diagram of a generative adversarial network in some examples.
Figure 5:
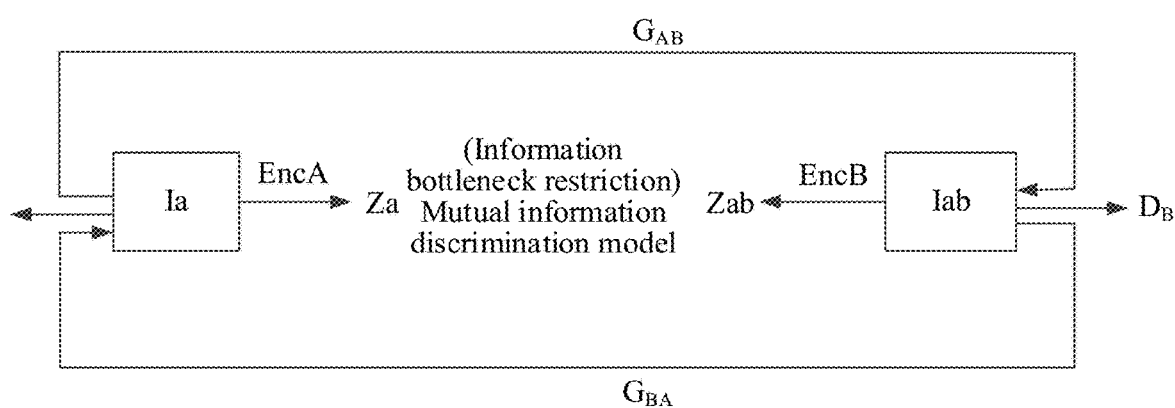
FIG. 5 is a structural diagram of a cycle-consistent adversarial network in some examples.

In some examples, when the image processing model may be the generative network model in the generative adversarial network, the first encoding model and the second encoding model may be set based on the generative adversarial network, and feature extraction may be performed using the first encoding model and the second encoding model. As shown in FIG. 4, on the basis that a generator $G_{AB}$ and a discriminator $D_B$ form the GAN, a first encoding model EncA and a second encoding model EncB may be set; the first encoding model EncA can encode the first image Ia into a feature space Z, and an image may be represented by a feature vector so as to obtain a first image feature Za which can be expressed as Za=EncA(Ia); and the second encoding model EncB can encode the second image Iab into the feature space Z so as to obtain a second image feature Zab which can be expressed as Zab=EncB(Iab). Similarly, the encoding models can be added into the CycleGAN, as shown in FIG. 5.

In some examples, the encoding models may be models for extracting the image content information, and for encoding models to be trained, the extracted image features may include both image content features and image domain features, and the image domain features in the image features extracted by the encoding models can be made as few as possible and include image content features as many as possible through continuous training for the encoding models.

Step 206, a correlation degree between the first image feature and the second image feature may be calculated to obtain a target feature correlation degree, the target feature correlation degree may be used for characterizing the degree of similarity between the first image feature and the second image feature in content information.

The correlation degree may be used for characterizing the degree of similarity, and the greater the correlation degree is, the greater the degree of similarity is. The target feature correlation degree may be used for reflecting the degree of similarity between the first image feature and the second image feature, and the degree of similarity between the first image feature and the second image feature may be in positive correlation with the target feature correlation degree. The server may obtain a first model loss value based on the target feature correlation degree, wherein the first model loss value may be in negative correlation with the target feature correlation degree.

The positive correlation means that: when other conditions may be unchanged, two variables change in the same direction, and when one variable changes from large to small, the other variable also changes from large to small. It can be understood that the positive correlation described herein means that the directions of change may be consistent, but it may not be required that when one variable changes a little, the other variable must change too. For example, it can be set that when a variable a ranges from 10 to 20, a variable b may be 100, and when the variable a ranges from 20 to 30, the variable b may be 120. Thus, for the directions of change of a and b, when a may be increased, b may be also increased. However, when a ranges from 10 to 20, b may be unchanged.

The negative correlation means that: when other conditions may be unchanged, two variables change in opposite directions, and when one variable changes from large to small, the other variable changes from small to large. It can be understood that the negative correlation described herein means that the directions of change may be opposite, but it may not be required that when one variable changes a little, the other variable must change too.

Specifically, the server may input the first image feature and the second image feature to a feature discrimination model, for example, a feature composed of the first image feature and the second image feature may be input to the feature discrimination model, and the feature discrimination model may calculate the target feature correlation degree between the first image feature and the second image feature. The feature discrimination model may be a neural network model to be trained or a trained neural network model. The input of the feature discrimination model may include a positive sample feature and may further include a negative sample feature, the positive sample feature refers to a feature composed of a feature of an image not processed by the image processing model and a feature of an image processed by the image processing model, such as a feature composed of the first image feature and the second image feature. The negative sample feature refers to a feature composed of features of images from different image domains. For example, an image can be selected from the second image domain, feature extraction may be performed on the selected image, and the extracted feature may be combined with the first image feature to obtain the negative sample feature.

In some examples, the feature discrimination model may perform calculation according to an input sample feature to obtain a probability for reflecting the size of mutual information, and the probability obtained by calculation may be in positive correlation with the mutual information among features included in the sample feature, for example, when the sample feature may be the positive sample feature composed of the first image feature and the second image feature, the mutual information of the first image feature and the second image feature may be in positive correlation with the probability obtained by the feature discrimination model. The server may obtain the target feature correlation degree according to the probability output by the feature discrimination model.

In some examples, when the image processing model may be the generative network model in the generative adversarial network, the feature discrimination model may be set based on setting the encoding models, as shown in FIGS. 4 and 5, the feature discrimination model may, for example, be a DMI (mutual information discriminator) in FIG. 4 or 5. Features output by the first encoding model EncA and the second encoding model EncB may be discriminated using the feature discrimination model, and the target feature correlation degree may be determined according to a discrimination result.

In some examples, the server may determine the first model loss value according to the target feature correlation degree, for example, an inverse number of the target feature correlation degree may be taken as the first model loss value, and when there may be a plurality of first images, a statistical value of the target feature correlation degree corresponding to each first image may be calculated to obtain the first model loss value. The first model loss value may be in negative correlation with the statistical value of the target feature correlation degree.

In some examples, the server may construct the negative sample feature corresponding to the feature discrimination model according to at least one of the first image feature and the second image feature, input the negative sample feature to the feature discrimination model to obtain the first feature correlation degree, and perform calculation according to the first feature correlation degree and the target feature correlation degree to obtain the first model loss value, for example, the difference of the first feature correlation degree and the target feature correlation degree may be taken as the first model loss value. The first model loss value may be in positive correlation with the first feature correlation degree.

In some examples, the target feature correlation degree may be used for reflecting the size of mutual information of the first image feature and the second image feature, and the mutual information of the first image feature and the second image feature may be in positive correlation with the target feature correlation degree. The greater the mutual information is, the greater the degree of similarity between the first image feature and the second image feature is.

Step 208, feature value distribution of the first image feature may be acquired to obtain first feature value distribution, and feature value distribution of the second image feature may be acquired to obtain second feature value distribution.

The first image feature may include a plurality of first feature values, and the second image feature may include a plurality of second feature values. The feature value distribution refers to the rule of values of the feature values in the image features. The first feature value distribution may include occurrence probabilities corresponding to a plurality of first distribution values, and may be conditional probability distribution. The second feature value distribution may include occurrence probabilities corresponding to a plurality of second distribution values. The occurrence probabilities may be used for characterizing the occurrence probabilities of distribution values in the feature value distribution. For example, if the feature value distribution may be normal distribution, the distribution values may be occurrence probabilities in the normal distribution, and the occurrence probabilities corresponding to the distribution values can be obtained by calculation achieved by setting independent variables of normal distribution functions as the distribution values.

The first distribution values in the first feature value distribution may be the same as or different from the first feature values in the first image feature. The second distribution values in the second feature value distribution may be the same as or different from the second feature values in the second image features. The number of the first distribution values included in the first feature value distribution may be the same as the number of the second distribution values included in the second feature value distribution. There may be a correspondence between each first distribution value and each second distribution value, for example, there may be a correspondence. For example, when the first distribution values and the second distribution values may be obtained by performing calculation according to the same numerical value, there may be a correspondence between the first distribution values and the second distribution values.

Specifically, the server may perform statistical calculation according to the first feature value in the first image feature to obtain a first statistical value corresponding to the first image feature, and determine the first feature value distribution according to the first statistical value, for example, it may perform mean value calculation on each first feature value to obtain a mean value corresponding to the first image feature, perform standard deviation calculation on each first feature value to obtain a standard deviation corresponding to the first image feature, and determine the first feature value distribution according to the mean value and the standard deviation corresponding to the first image feature.

In some examples, the distribution values in the feature value distribution may be obtained by sampling. For example, the server may determine a distribution function satisfied by the first image feature according to the first statistical value, perform sampling from the satisfied distribution function to obtain each sampling value, determine a probability corresponding to each sampling value in the satisfied distribution function, and obtain the first feature value distribution according to the probability corresponding to each sampling value respectively. The method for obtaining the second feature value distribution refers to the relevant steps for obtaining the first feature value distribution.

In some examples, the step that the first feature value distribution may be determined and the step that the second feature value distribution may be determined according to a target coefficient set may be performed in parallel, e.g. simultaneously or sequentially.

Step 210, a correlation degree between the first feature value distribution and the second feature value distribution may be calculated to obtain a distribution correlation degree, wherein the amount of image domain information contained in the first image feature and the second image feature may be in negative correlation with the distribution correlation degree;

The distribution correlation degree may be used for reflecting the degree of similarity between the first feature value distribution and the second feature value distribution, and the degree of similarity between the first feature value distribution and the second feature value distribution may be in positive correlation with the distribution correlation degree. The amount of image domain information refers to the size of the image domain information. The larger the amount of image domain information is, the more the image domain information may be contained in the image features.

Specifically, the server may select a first distribution value and a second distribution value obtained by calculation based on the same target coefficient from the first feature value distribution and the second feature value distribution, acquire an occurrence probability corresponding to the first distribution value and an occurrence probability corresponding to the second distribution value, and obtain the distribution correlation degree according to a difference value of the occurrence probability corresponding to the first distribution value and the occurrence probability corresponding to the second distribution value.

In some examples, the server may obtain a second model loss value based on the distribution correlation degree, wherein the second model loss value may be in negative correlation with the distribution correlation degree. The server may calculate a value of a divergence of the first feature value distribution and the second feature value distribution using a divergence calculation formula to obtain a target divergence, and determine the distribution correlation degree according to the target divergence, wherein the target divergence may be in negative correlation with the distribution correlation degree. The divergence calculation formula may, for example, be a KL (Kullback-Leibler) divergence. The server may obtain the second model loss value according to the target divergence, for example, the target divergence may be used as the second model loss value.

In some examples, the server may obtain the target model loss value based on the first model loss value and the second model loss value.

The target model loss value may be in positive correlation with the first model loss value and may be in positive correlation with the second model loss value. The target model loss value may be a result obtained by performing weighted calculation on the first model loss value and the second model loss value.

Specifically, the server may select a target model loss value from the first model loss value and the second model loss value in a loss value selection manner, for example, it may select a larger value from the first model loss value and the second model loss value as the target model loss value, or select a smaller value as the target model loss value. The server may further perform weighted calculation on the first model loss value and the second model loss value to obtain the target model loss value, for example, a result obtained after the first model loss value and the second model loss value may be added may be calculated as the target model loss value.

Step 212, model parameters of the image processing model may be adjusted to a direction in which the target feature correlation degree may be increased and a direction in which the distribution correlation degree may be increased to obtain a trained image processing model, so that an image may be processed using the trained image processing model.

Specifically, the server may adjust the model parameters of the image processing model based on the target model loss value to obtain the trained image processing model. The server may adjust the model parameters in the image processing model to a direction, in which the target model loss value may be reduced, using a gradient descent method such as an Adam-based gradient descent method to obtain the trained image processing model. After the trained image processing model may be obtained, image process may be performed using the trained image processing model. For example, an image of a first style may be converted into an image of a second style, or an image acquired by a first medical device may be converted into an image that meets the standard of an image acquired by a second medical device.

It can be understood that the training for the model may be iterated for many times, i.e. the trained image processing model may be iteratively trained, the training may be stopped when a model convergence condition may be satisfied, and the model convergence condition may be that the change of the model loss value may be less than a change value of a preset loss value, or may be that the change in the model parameters may be less than a change value of a preset parameter. For example, when there may be a plurality of first images, the training may be performed for many times, and model training may be performed using the plurality of first images every time.

In some examples, the server may adjust the model parameters of the image processing model, the model parameters of the first encoding model, and the parameters of the second encoding model based on the target model loss value to obtain a trained image processing model, first encoding model and second encoding model, so that the image may be processed using the trained image processing model.

In the above-mentioned image processing method, the first image belonging to the first image domain may be acquired, the first image may be input to the image processing model to be trained to obtain the second image belonging to the second image domain, feature extraction may be performed on the first image to obtain the first image feature, feature extraction may be performed on the second image to obtain the second image feature, the correlation degree between the first image feature and the second image feature may be calculated to obtain the target feature correlation degree, the feature value distribution of the first image feature may be acquired to obtain the first feature value distribution, the feature value distribution of the second image feature may be acquired to obtain the second feature value distribution, the correlation degree between the first feature value distribution and the second feature value distribution may be calculated to obtain the distribution correlation degree; the model parameters of the image processing model may be adjusted to the direction in which the target feature correlation degree may be increased and the direction to which the distribution correlation degree may be increased to obtain the trained image processing model, so that the image may be processed using the trained image processing model. The amount of image domain information contained in the first image feature and the second image feature may be in negative correlation with the distribution correlation degree, the greater the distribution correlation degree is, the less the information relevant to the image domains, in the first image feature and the second image feature is, and therefore, by adjusting the model parameters to the direction in which the distribution correlation degree may be increased, the image domain information in the first image feature and the second image feature can be reduced, and the information in the first image feature and the second image feature may be mainly the image content information. The target feature correlation degree may be used for characterizing the degree of similarity between the first image and the second image in content information, the greater the target feature correlation degree is, the greater the degree of similarity between the first image feature and the second image feature in content information is, and therefore, by adjusting the model parameters to the direction in which the target feature correlation degree may be increased, the second image feature and the first image feature can be kept consistent in content information, the situation that the generated second image deforms can be reduced, and the accuracy of the image processing model and the image processing effect can be improved.

The principle of the image processing method provided in the present subject matter may be described as follows:

the target model loss value may be used for adjusting the parameters of the encoding models so that the features output by the encoding models include the image domain information as little as possible and the image content information as much as possible. To achieve this purpose, the first model loss value and the second model loss value may be determined according to an information bottleneck (IB) theory. For example, after a first image feature Za and a second image feature Zb may be acquired in FIG. 4 or FIG. 5, the first model loss value and the second model loss value may be determined according to the information bottleneck theory. An information bottleneck may be a theoretical basis for improving the robustness of representing learning, and may be a low-dimensional representation for compressing the information of an input image into associated information relevant to a target.

According to the information bottleneck theory, the representation of the image content information and the representation of the image domain information may be determined. For example, the image content information may be represented as I(Zab;Iab|Ia), the image domain information may, for example, be represented as I(Ia;Zab). Ia represents the first image, iab represents the second image, za represents the first image feature, and Zab represents the second image feature. I(Zab;Iab|Ia) may be conditional mutual information which means that under the condition that the first image Ia may be known, the mutual information of the second image feature Zab and the second image Iab can only contain redundant information in addition to the image content information, that is, the image domain information may be only included, and when I(Zab;Iab|Ia) may be reduced, it indicates that the redundant information in the second image feature Zab may be reduced. I(Ia;Zab) represents mutual information of the first image Ia and the second image feature Zab. Since Zab may be a feature extracted from Iab, when I(Ia;Zab) may be increased, it indicates that the image content information in the second image feature Zab may be increased. I(Zab;Iab|Ia) may be referred to as redundant information, and I(Ia;Zab) may be referred to as tag information. Similarly, the image content information may be represented as I(Za;Ia|Iab), and the image domain information may, for example, be represented as I(Iab;Za). Representations of the two loss values may be determined as formulae $L_{Z_{ab}}=I(Z_{ab};I_{ab}|I_a)-\lambda_1 I(I_a;Z_{ab})$ (1) and $L_{Z_a}=I(Z_a;I_a|I_{ab})-\lambda_2 I(I_{ab};Z_a)$ (2), respectively. $\lambda_1$ and $\lambda_2$ represent the Lagrange multipliers of constrained optimization, may be both non-negative numbers, for example, each may be 1. $L_{Z_{ab}}$ may be in positive correlation with I(Zab;Iab|Ia) and may be in negative correlation with I(Ia;Zab). By minimizing $L_{Z_{ab}}$, the purposes of minimizing I(Zab;Iab|Ia) and maximizing I(Ia;Zab) can be achieved. $L_{Z_a}$ may be in positive correlation with I(Za;Ia|Iab) and may be in negative correlation with I(Iab;Za). By minimizing $L_{Z_a}$, the purposes of minimizing I(Za;Ia|Iab) and maximizing I(Iab;Za) can be achieved. Therefore, the target model loss value obtained according to $L_{Z_{ab}}$ and $L_{Z_a}$ may ensure that the features output by the encoding models include the image domain information as little as possible and the image content information as much as possible. When the method based on the information bottleneck theory may be used to solve the problem of content deformation in a domain adaptation process, learning may be performed without additional marking information, so that not only may be the convenience for model creation improved, but also multi-directional image migration may be achieved under the condition of ensuring that the image content may be unchanged, which may be conducive to data expanded to more scenes.

A mean value of $L_{Z_{ab}}$ and $L_{Z_a}$ may be determined, an upper bound of the mean value may be determined, a problem of minimizing $L_{Z_{ab}}$ and $L_{Z_a}$ may be converted into a problem of minimizing the upper bound which may be expressed as:

$$L_{IB} = -I(Z_a; Z_{ab}) - \frac{\beta}{2}(D_{KL}(p(Z_a|I_a)\|p(Z_{ab}|I_{ab})) + D_{KL}(p(Z_{ab}|I_{ab})\|p(Z_a|I_a))) \quad (3)$$

wherein $D_{KL}$ may be a KL divergence. $p(Z_a|I_a)$ and $p(Z_{ab}|I_{ab})$ may be conditional distribution, $D_{KL}(p(Z_a|I_a)\|p(Z_{ab}|I_{ab}))$ and $D_{KL}(p(Z_{ab}|I_{ab})\|p(Z_a|I_a))$ may be two KL divergences of $p(Z_a|I_a)$ and $p(Z_{ab}|I_{ab})$, and may be used for representing the degree of similarity between $p(Z_a|I_a)$ and $p(Z_{ab}|I_{ab})$, and the degree of similarity between $p(Z_a|I_a)$ and $p(Z_{ab}|I_{ab})$ may be in negative correlation with the KL divergence of the both.

The purpose of $D_{KL}(p(Z_a|I_a)\|p(Z_{ab}|I_{ab}))+D_{KL}(p(Z_{ab}|I_{ab})\|p(Z_a|I_a))$ may be to constrain Za and Zab with respect to the feature extraction on the content information excluding the redundant information of domains. $\beta$ may be a super parameter for adjusting weights of the two items on the right side of the formula, which may be customized and may be negative. By constraining the minimization of $L_{IB}$, I(Za;Zab) may be maximized under the condition that the KL divergence of Za and Zab may be constrained to be small as much as possible, which can effectively maintain the consistency of image content during image conversion; and the KL divergence constrains the distribution of Za and Zab, so that Za and Zab encoded by a network may be compressed, i.e. the image domain information may be kept in Za and Zab as little as possible.

Since the probability distribution of the $p(Z_a|I_a)$ and $p(Z_{ab}|I_{ab})$ can be estimated, that is, the KL divergence of the both can be calculated, and therefore, the problem of minimizing $L_{IB}$ can be converted into a problem of maximizing I(Ia;Zab). There may be a lower bound in I(Ia;Zab), and therefore, the problem of maximizing I(Ia;Zab) may be converted into a problem of maximizing its lower bound which may be expressed, for example, as $\hat{I}^{(DV)}(Z_a;Z_{ab})$ in a formula (4).

$$I(Z_a;Z_{ab}) \geq \hat{I}^{(DV)}(Z_a;Z_{ab}) = E_J[D_{MI}(Z_a;Z_{ab})] - \log E_M[e^{D_{MI}(Z_a;Z_b)}] \quad (4)$$

$\hat{I}^{(DV)}(Z_a;Z_{ab})$ may be a lower bound of the mutual information, which may be represented using Donsker-Varadhan (DV) of the KL divergence. DMI: $Z_a \times Z_{ab} \rightarrow R$ may be a discriminator function built by a convolutional neural network, wherein I(Za;Zab) represents the mutual information of Za and Zab, and I(Za;Zb) represents mutual information of Za and Zb. $D_{MMI}$ may be a mutual information discriminator, and $D_{MI}(Z_a;Z_{ab})$ may be a discrimination result obtained by inputting Za and Zab to $D_{MI}$. J represents a positive sample of the mutual information discriminator, which may, for example, be a feature obtained by merging Za and Zab, and J may also be referred to as joint distribution. M represents a negative sample of the mutual information discriminator, and may, for example, be a feature obtained by merging Za and Zb, and M may also be referred to as edge distribution. $E_M$ may be an expectation of M, and $E_J$ may be an expectation of J. $E_J[D_{MI}(Z_a;Z_{ab})] - \log E_M[e^{D_{MI}(Z_a;Z_b)}]$ represents a logarithm of a result obtained by subtracting the expectation of M by the expectation of J.

In some examples, the image processing method provided in the present subject matter may be used for domain adaptation for medical images in a medical scene. The medical images may, for example, be images of a fundus, an endoscope, a CT (Computed Tomography) or MR (Magnetic Resonance). For example, due to different devices for acquiring medical images or different staining methods, the obtained medical images differ in the degree of colour or brightness, so that the medical images include images in a plurality of different image domains, and the images in the different domains can be converted using the image processing method provided in the present subject matter to generate images of which the domains may be relatively similar, so that medical models can be trained using these images, and the trained medical models can be used in medical applications such as classification or segmentation for the medical images.

In some examples, the step that feature value distribution of the first image feature may be acquired to obtain first feature value distribution includes: statistics may be performed on each feature value in the first image feature to obtain a first statistical value; and the feature value distribution of the first image feature may be determined according to the first statistical value to obtain the first feature value distribution.

The image feature may include a plurality of feature values. The first feature value refers to a feature value included by the first image feature. The first statistical value may be obtained by performing statistical calculation on each first feature value, and the statistical calculation includes, but may not be limited to mean value calculation, standard deviation calculation or variance calculation.

Specifically, the server may calculate a mean value of each first feature value to obtain a target mean value, calculate a standard deviation of each first feature value to obtain a target standard deviation, and obtain a first statistical value according to the target mean value and the target standard deviation. The server may perform a linear operation on the target mean value and the target standard deviation to obtain a plurality of linear operation values, determine an occurrence probability respectively corresponding to each linear operation value, and obtain the first feature value distribution according to the occurrence probability corresponding to each linear operation value.

In some examples, the server may obtain a target coefficient set, and perform a linear operation on the target mean value and the target standard deviation using target coefficients in the target coefficient set to obtain a linear operation value. The target coefficients in the target coefficient set may be obtained by sampling, for example, they can be obtained by sampling a preset distribution function, and the preset distribution function may, for example, be a normal distribution function, wherein the normal distribution function standard normal distribution and non-standard normal distribution, the mean value corresponding to the standard normal distribution may be 0, and the standard deviation may be 1. Of course, the target coefficient set may be preset.

In some examples, the server may determine a target distribution function according to the target mean value and the target standard deviation, set the independent variable of the target distribution function as a linear operation value, and take a calculation result of the target distribution function as the occurrence probability corresponding to the linear operation value. The target distribution function and the preset distribution function belong to the same type of distribution function, for example, the preset distribution function may be standard normal distribution, the target distribution function may be a normal distribution function, the mean value of the normal distribution function may be the target mean value, and the standard deviation may be the target standard deviation. The calculation manner of the second feature value distribution may refer to the calculation manner of the first feature value distribution.

In some examples, the step that the first feature value distribution may be obtained and the step that the second feature value distribution may be obtained may be performed simultaneously. After obtaining the target coefficient set, the server may perform parallel calculation according to the target coefficient set to obtain the first feature value distribution and the second feature value distribution.

In some examples, the server may input the first image feature to a statistical operational model which may calculate each first feature value and output the first statistical value such as the target mean value and the target standard deviation. The server may train the statistical calculation model according to the second model loss value, so that the statistical calculation model can perform the statistical calculation accurately.

In this example, the feature value in the image feature can accurately reflect statistical information of the image feature, and therefore, by performing statistics on each feature value in the first image feature to obtain the first statistical value, and determining the feature value distribution of the first image feature according to the first statistical value to obtain the first feature value distribution, the accuracy of the first feature value distribution can be improved.

In some examples, the first statistical value may include a target mean value and a target standard deviation, the step that the feature value distribution of the first image feature may be determined according to the first statistical value to obtain the first feature value distribution includes: a target coefficient set may be acquired, the target coefficient set may include a plurality of target coefficients; the target standard deviation may be scaled according to the target coefficients to obtain a target scaling value; translation processing may be performed on the target mean value based on the target scaling value to obtain target numerical values, and the target numerical values corresponding to all the target coefficients form a target numerical value set; a target occurrence probability corresponding to each of the target numerical values may be determined based on a probability distribution relationship corresponding to the target numerical value set, the probability distribution relationship may be distribution satisfied by the numerical values in the target numerical value set; The target occurrence probability corresponding to each of the target numerical values may be determined as a distribution value in the first feature value distribution.

The target mean value and the target standard deviation may be obtained by performing statistical calculation according to the features in the first image feature. The target scaling value may be a result obtained by scaling the target standard deviation according to the target coefficients. The target numerical value may be a result obtained by performing translation processing on the target mean value based on the target scaling value. The target numerical value set may include a plurality of target numerical values, the number of the target numerical values may be the same as the number of the target coefficients, and one target coefficient corresponds to one target numerical value. The probability distribution relationship corresponding to the target numerical value set refers to the distribution to which the data in the target numerical value set conforms.

The target coefficient set may be preset or may be obtained by sampling, for example, it may be a sampling value obtained by sampling a standard probability distribution which may be arbitrarily distribution such as normal distribution. When the target coefficient set may be obtained by sampling the standard probability distribution, the data distribution of the target coefficient set conforms to the standard probability distribution.

Specifically, the server may calculate the product of each target coefficient and the target standard deviation and realize scaling processing on the target standard deviation to obtain the target scaling value, and can calculate the sum of the target scaling value and the target mean value and realize translation processing on the target mean value to obtain the target numerical value respectively corresponding to each target coefficient to form the target numerical value set.

In some examples, the server may determine the target distribution function according to the target mean value and the target standard deviation, set an independent variable of the target distribution function as a target numerical value, take a calculation result of the target distribution function as a target occurrence probability corresponding to the target numerical value, take each target numerical value as the first feature value corresponding to the first feature value distribution, and obtain the first feature value distribution according to the target occurrence probability corresponding to each target numerical value, wherein the first feature value distribution may include the target occurrence probabilities corresponding to all the target numerical values respectively. The target distribution function and the preset distribution function belong to the same type of distribution function, for example, the preset distribution function may be standard normal distribution, the target distribution function may be a normal distribution function, and the mean value of the normal distribution function may be the target mean value, and the standard deviation may be the target standard deviation. Similarly, the server may perform calculation using the method provided in this example to obtain each second distribution value and each occurrence probability corresponding to each second distribution value in the second feature value distribution. That is, a first distribution value and a second distribution value may be obtained by calculation based on a target coefficient, so that there may be a correspondence between the first distribution value in the first feature value distribution and the second distribution value in the second feature value distribution.

In this example, since the target mean value and the target standard deviation can accurately reflect the distribution of the features, the first feature value distribution determined by the target mean value and a variance can accurately reflect the distribution of the first image features, and thus, the distribution accuracy may be improved.

In some examples, the step that the target coefficient set may be acquired includes: a standard probability distribution may be acquired, and numerical value sampling may be performed based on the standard probability distribution to obtain numerical values, correspondingly satisfying the standard probability distribution, as the target coefficients in the target coefficient set.

Specifically, the probability distribution relationship corresponding to the target numerical value set refers to distribution to which the data in the target numerical value set conforms. The standard probability distribution may be arbitrary probability distribution such as standard normal distribution. The server may generate a standard data set conforming to the standard probability distribution, perform random selection from the standard data set, for example, randomly select one piece of standard data from the standard data set at a time, and take the selected standard data as the target coefficients. The server may form the target coefficient set from the obtained target coefficients, and since the target coefficients in the target coefficient set may be selected from the standard data set, the distribution of the data in the target coefficient set conforms to the standard probability distribution. For example, when the data distribution of the standard data set conforms to the standard normal distribution, the data distribution of the target coefficient set also conforms to the standard normal distribution.

In this example, numerical value sampling may be performed based on the standard probability distribution to obtain the numerical values, correspondingly satisfying the standard probability distribution, as the target coefficients in the target coefficient set, so that the distribution of the data in the obtained target coefficient set conforms to the standard probability distribution, and then, the target coefficient set can have regularity.

In some examples, the target feature correlation degree may include a first feature discrimination probability, and the step that a correlation degree between the first image feature and the second image feature may be calculated to obtain a target feature correlation degree includes: the first image feature and the second image feature may be merged, and the merged feature may be determined as a positive sample feature; a feature discrimination model may be acquired, the positive sample feature may be input to the feature discrimination model to obtain the first feature discrimination probability; the step that model parameters of the image processing model may be adjusted to a direction in which the target feature correlation degree may be increased and a direction in which the distribution correlation degree may be increased to obtain a trained image processing model includes: a first model loss value may be obtained based on the first feature discrimination probability; the first feature discrimination probability may be in negative correlation with the first model loss value; a second model loss value may be obtained based on the distribution correlation degree, wherein the second model loss value may be in negative correlation with the distribution correlation degree; the model parameters of the image processing model may be adjusted based on the first model loss value and the second model loss value to obtain the trained image processing model.

The positive sample feature may be a concept opposite to the negative sample feature. Two or more image features may be included in the positive sample feature, the "more" refers to at least three. The negative sample feature may include two or more image features. The first model loss value may be in negative correlation with the first feature discrimination probability.

The first feature discrimination probability may be a probability obtained by inputting the positive sample feature obtained from the first image feature and the second image feature to the feature discrimination model and performing calculation by the feature discrimination model.

Specifically, the first image feature and the second image feature may be merged according to the channel dimension of a convolutional network to obtain the corresponding positive sample feature, and the positive sample feature may include the first image feature and the second image feature. For example, if the sizes of the first image feature and the second image feature may be both 16*16*128, the positive sample feature corresponding to the first image feature and the second image feature may be 16*16*256, wherein 16*16 may be the size of a matrix output by each channel, and 128 and 256 respectively represent the number of the channels.

In some examples, the server may take the inverse of the first feature discrimination probability as the first model loss value, or perform logarithmic calculation on the first feature discrimination probability to obtain a first feature logarithmic probability, take the inverse of the first feature logarithmic probability as the first model loss value, and may perform statistical calculation, such as weighted calculation, on the first feature discrimination probability or the first feature logarithmic probability to obtain the first model loss value when there may be a plurality of first images.

In this example, the target feature correlation degree may include the first feature discrimination probability; the first image feature and the second image feature may be merged, and the feature obtained by mergence may be determined as the positive sample feature; the feature discrimination model may be acquired; the positive sample feature may be input to the feature discrimination model to obtain the first feature discrimination probability; the first model loss value may be obtained based on the first feature discrimination probability; the first model loss value may be determined according to the positive sample feature composed of the first image feature and the second image feature; the second model loss value may be obtained based on the distribution correlation degree; and the model parameters of the image processing model may be adjusted based on the first model loss value and the second model loss value to obtain the trained image processing model. The second model loss value may be in negative correlation with the distribution correlation degree, and the greater the distribution correlation degree is, the less the information relevant to the image domains may be in the first image feature and the second image feature is, and therefore, by adjusting the model parameters to a direction in which the second model loss value may be reduced, the amount of image domain information contained in the first image feature and the second image feature can be reduced, and the image content information can be increased. The first feature discrimination probability may be in negative correlation with the first model loss value, the greater the first feature discrimination probability is, the greater the degree of similarity between the first image and the second image in content information is, and therefore, by adjusting the model parameters of the image processing model and the feature discrimination model to a direction in which the first model loss value may be reduced, the first feature discrimination probability changes to a direction in which the first model loss value may be reduced, namely, to a direction in which the difference of the first image feature and the second image feature may be reduced, so that the second image and the first image can be kept consistent in content information, the situation that the second image deforms may be reduced, the accuracy of the image processing model may be made higher and higher, and the accuracy of the image processing model and the image processing effect may be improved.

In some examples, the method further includes: a third image in a second image domain may be acquired, the third image may be different from the second image; feature extraction may be performed on the third image to obtain a third image feature; and a negative sample feature may be obtained based on the target image feature and the third image feature, the negative sample feature may be input to the feature discrimination model to obtain a second feature discrimination probability, the target image feature may be the first image feature or the second image feature; the step that a first model loss value may be obtained based on the first feature discrimination probability includes: the first model loss value may be obtained based on the first feature discrimination probability and the second feature discrimination probability, wherein the second feature discrimination probability may be in positive correlation with the first model loss value.

The third image belongs to the second image domain. The third image may be different from the second image. The target image feature may include at least one of the first image feature and the second image feature. The second feature discrimination probability may be a probability obtained by inputting the negative sample feature to the feature discrimination model and performing calculation by the feature discrimination model. The first model loss value may be in negative correlation with the first feature discrimination probability and may be in positive correlation with the second feature discrimination probability.

Specifically, the server may perform feature extraction on the third image using a second encoding model to obtain a third image feature, and form the corresponding negative sample feature from the target image feature and the third image feature, for example, the first image feature and the third image feature can be merged to obtain the corresponding negative sample feature.

In some examples, the server may obtain the first model loss value according to the difference of the second feature discrimination probability and the first feature discrimination probability, for example, may calculate a result, obtained after the first feature discrimination probability may be subtracted by the second feature discrimination probability, as the first model loss value, or perform logarithmic calculation on the second feature discrimination probability to obtain a second feature logarithmic probability, perform logarithmic calculation on the first feature discrimination probability to obtain the first feature logarithmic probability, and calculate the difference of the second feature logarithmic probability and the first feature logarithmic probability to obtain the first model loss value. When there may be a plurality of positive sample features or negative sample features, and the "a plurality of" refers to at least two, statistical calculation may be performed on the second feature logarithmic probability and the first feature logarithmic probability to obtain the first model loss value.

In some examples, the feature discrimination model may classify the sample features according to the probability obtained by calculation to obtain predicted classes corresponding to the sample features; when the predicted classes may be consistent with the real classes of the sample features, it indicates that a discrimination result of the feature discrimination model may be accurate; and with the training for the feature discrimination model, the discrimination result of the feature discrimination model may be more and more accurate. The true classes of the sample features may be determined according to labels of the sample features. The positive sample feature corresponds to a positive sample label such as "real", and the negative sample feature corresponds to a negative sample label such as "fake".

Figure 6:
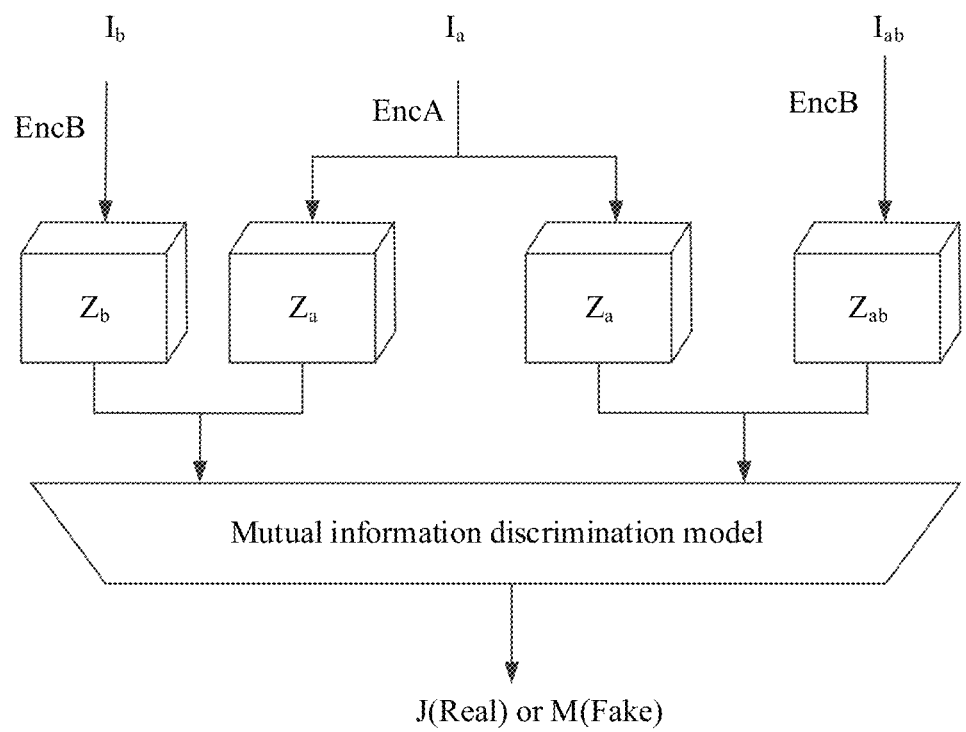
FIG. 6 is a schematic diagram of input of sample features to a feature discrimination model to obtain feature discrimination probabilities in some examples.

By way of an example, the feature discrimination model may, for example, be the DMI (Mutual Information Discriminator) model in FIG. 6. As shown in FIG. 6, Ib represents the third image, EncA represents the first encoding model, EncB represents the second encoding model, and Zb represents the third image feature; the positive sample feature composed of the first image feature Za and the second image feature Zab may be input to the mutual information discrimination model, and the negative sample feature composed of the first image feature Za and the third image feature Zb may be input to the mutual information discrimination model, J represents the positive sample feature, and M represents the negative sample feature; and when the training for the mutual information discrimination model may be completed, the positive sample feature labeled with real can be accurately identified as a real class, and the negative sample feature labeled with fake can be identified as a fake class. The mutual information discrimination model may also be referred to as a mutual information discriminator.

In some examples, the server may determine whether the sample feature may be the positive sample feature or the negative sample feature according to the sample labels, when it may be determined that the sample label may be a positive sample label, acquire a feature discrimination probability obtained by the feature discrimination model, and perform calculation according to the feature discrimination probability to obtain a positive sample loss value, wherein the positive sample loss value may be in negative correlation with the feature discrimination probability. When it may be determined that the sample label may be a negative sample label, the feature discrimination probability obtained by the feature discrimination model may be acquired; calculation may be performed according to the feature discrimination probability to obtain a negative sample loss value, wherein the negative sample loss value may be in positive correlation with the feature discrimination probability; and weighted calculation may be performed according to each positive sample loss value and each negative sample loss value to obtain the first model loss value.

In some examples, the server makes the first model loss value change to a reduction direction by adjusting the parameters of the feature discrimination model and the image processing model; since the first feature discrimination probability may be in negative correlation with the first model loss value and the second feature discrimination probability may be in positive correlation with the first model loss value, the first feature discrimination probability can be made to change to an increment direction and the second feature discrimination probability can be made to change to a reduction direction; and since the mutual information of the first image feature and the second image feature may be in positive correlation with the first feature discrimination probability, the mutual information of the first image feature and the second image feature may change to an increment direction, and thus, the mutual information of the first image feature and the second image feature may be maximized. When the first image feature and the second image feature only include the image content features, the mutual information of a content feature of the first image and a content feature of the second image can be maximized, so that the content feature of the second image may be consistent with the content feature of the first image, the situation that the second image obtained by the image processing model deforms may be reduced, and the accuracy of the image processing model and the image processing effect may be improved.

In this example, the negative sample feature may be obtained based on the target image feature and the third image feature, the negative sample feature may be input to the feature discrimination model to obtain the second feature discrimination probability, and the first model loss value may be obtained based on the first feature discrimination probability and the second feature discrimination probability, so that the first model loss value may be determined according to the negative sample feature composed of the target image feature and the third image feature; and then, the model parameters of the image processing model and the feature discrimination model can be adjusted according to the first model loss value, so that accurate discrimination can be performed by the feature discrimination model, the accuracy of the image processing model may be made higher and higher, and the accuracy of the image processing model and the image processing effect may be improved.

In some examples, the method further includes: a model parameter adjustment gradient corresponding to the feature discrimination model may be obtained based on the first model loss value; and model parameters of the gradient adjustment feature discrimination model may be adjusted based on the model parameters.

The model parameter adjustment gradient refers to a parameter for adjusting model parameters, the model parameter adjustment gradient can be obtained by performing calculation according to the first model loss value, for example, derivative operation may be performed on the first model loss value to obtain the model parameter adjustment gradient.

Specifically, the server may perform back propagation according to the first model loss value, and update the model parameters of the feature discrimination model in a direction in which the model parameter adjustment gradient descends during the back propagation.

In some examples, the server may perform back propagation according to the first model loss value, and update the model parameters of the image processing model and the feature discrimination model in a direction in which the model parameter adjustment gradient descends during the back propagation, thereby realizing the joint training for the image processing model and the feature discrimination model.

In this example, the model parameter adjustment gradient corresponding to the feature discrimination model may be obtained based on the first model loss value, and the model parameters of the feature discrimination model may be adjusted based on the model parameter adjustment gradient, so that model parameters of the feature discrimination model can be adjusted quickly, the speed that the model converges may be increased, and the model training efficiency may be increased.

In some examples, the method further includes: a current image processing model may be acquired; a reference image may be input to the current image processing model for processing to obtain a processed image; the reference image belongs to the first image domain; a deformation degree of the processed image relative to the reference image may be determined to obtain a target deformation degree; when it may be determined that the target deformation degree may be greater than a deformation degree threshold, the current image processing model may be determined as an image processing model to be trained, the step that a first image belonging to a first image domain may be acquired may be entered; otherwise, the current image processing model may be trained based on a training image, and the step that a reference image may be input to the current image processing model for processing may be returned; the training image belongs to the first image domain.

The current image processing model may be initialized by an initial image processing model. The initial image processing model may be a neural network model that has not been trained, or a model that has been trained, but may be required to be further optimized. The training image and the reference image both belong to the first image domain, and the reference image may be different from the training image. There may be a plurality of training images, there may also be a plurality of reference images, and "a plurality of" refers to at least two. The current image processing model refers to an image processing model trained at the current time. The processed image may be an image obtained by processing a reference image by the current image processing model. The target deformation degree refers to a deformation degree of the processed image relative to the reference image, and the deformation degree threshold may be set as required or preset.

When the current image processing model may be trained based on the training image, a label image of the training image may be acquired, the label image of the training image belongs to the second image domain, and the content thereof may be consistent with that of the training image. For example, there may be a camera A and a camera B, an image photographed by the camera A belongs to the first image domain, and an image photographed by the camera B belongs to the second image domain; and the two cameras may be respectively used for photographing a scene on the same spatial position to obtain two photographed images, and then, the image photographed by the camera A can be taken as the training image, and the image photographed by the camera B can be taken as the label image of the training image. The server may input the training image to the current image processing model, process the training image using the current image processing model to obtain a predicted image, calculate the difference of the predicted image and the label image of the training image to obtain an image difference value, and adjust parameters of the current image processing model to a direction in which the image difference value may be reduced so as to achieve the training for the current image processing model. Since the label image belongs to the second image domain, by adjusting the parameters of the current image processing model to a direction in which the image difference value may be reduced, the predicted image generated by the current image processing model may be made more and more similar to the label image, and thus, the current image processing model learns the capability of converting an image in the first image domain into an image in the second image domain. Specifically, the server may perform a plurality of rounds of training on the current image processing model according to different training images, and input the reference image to the current image processing model after each round of training to obtain the processed image. The server may also firstly perform a plurality of rounds of training on the current image processing model using the different training images, and process the reference image using the current image processing model to obtain the processed image.

In some examples, the server may acquire the target deformation degree corresponding to the processed image from the terminal. Specifically, the server may send the processed image to one or more image viewing terminals, wherein "a plurality of" refers to at least two, the image viewing terminals may present the processed image and may acquire user's operation on the processed image, for example, the image viewing terminals may present a deformation degree acquisition area, receive a deformation degree input or selected by a user via the deformation degree acquisition area, and return the deformation degree received by the deformation degree acquisition area to the server, and the server may take the deformation degree returned by the image viewing terminals as the target deformation degree. When there may be a plurality of image viewing terminals, the server may acquire the deformation degrees respectively returned by each image viewing terminal, perform statistical calculation, such as weighted calculation, on each deformation degree, and take a result of the weighted calculation as the target deformation degree.

In some examples, the server may compare the target deformation degree with the deformation degree threshold, when it may be determined that the target deformation degree may be greater than the deformation degree threshold, determine the current image processing model as the image processing model to be trained, and enter the step that the first image belonging to the first image domain may be acquired. The server may also calculate a deformation degree difference value of the target deformation degree and the deformation degree threshold, when the deformation degree difference value may be greater than the difference value threshold, determine the current image processing model as the image processing model to be trained, and enter the step that the first image in the first image domain may be acquired. The deformation degree difference value may be determined as required or preset. When it may be determined that the target deformation degree may be less than the deformation degree threshold, the current image processing model may be trained based on the training image, and the step that the reference image may be input to the current image processing model for processing may be returned, wherein the training image belongs to the first image domain.

In this example, the current image processing model may be trained based on the training image, so that the current image processing model learns the capability of image domain migration, namely the capability of obtaining the image in the second image domain according to the image in the first image domain; When it may be determined that the target deformation degree of the processed image relative to the reference image may be greater than the deformation degree threshold, the step that the first image in the first image domain may be acquired may be entered, that is, when it may be determined that the target deformation degree of the processed image relative to the reference image may be greater than the deformation degree threshold, the parameters of the image processing model may be adjusted according to the target feature correlation degree and the distribution correlation degree, so that the parameters of the image processing model may be adjusted using the target feature correlation degree and the distribution correlation degree at the appropriate time, the situation that the image output by the image processing model deforms may be reduced, and the efficiency and accuracy of model training may be improved.

In some examples, the step that a correlation degree between first feature value distribution and second feature value distribution may be calculated to obtain a distribution correlation degree includes: a first distribution value may be acquired from the first feature value distribution, and a second distribution value corresponding to the first distribution value may be acquired from the second feature value distribution; difference calculation may be performed on the first distribution value and the second distribution value to obtain a difference value; and the distribution correlation degree may be determined based on the difference value, wherein the distribution correlation degree may be in negative correlation with the difference value.

There may be a correspondence between the first distribution value and the second distribution value calculated according to the same target coefficient, that is, if the first distribution value may be obtained by calculation based on the target coefficient A, the second distribution value corresponding to the first distribution value may be also obtained by calculation based on the target coefficient A.

Specifically, the server may select the first distribution value and the second distribution value obtained by calculation based on the same target coefficient from the first feature value distribution and the second feature value distribution, calculate a difference value of an occurrence probability of the first distribution value and an occurrence probability of the second distribution value, and determine the target divergence of the first feature value distribution and the second feature value distribution according to the difference value, wherein the target divergence may be in positive correlation with the difference value, and the distribution correlation degree may be in negative correlation with the target divergence. Since the second model loss value may be in negative correlation with the distribution correlation degree, the second model loss value may be in positive correlation with the target divergence degree.

In some examples, the target divergence may include a first divergence and a second divergence. The server may calculate a ratio of the occurrence probability of the first distribution value to the occurrence probability of the corresponding second distribution value to obtain a first probability ratio as the difference value of the first distribution value and the second distribution value, or calculate the first probability ratio, for example, perform logarithmic operation on the first probability ratio, take a result of the logarithmic operation as the difference value of the first distribution value and the second distribution value, and determine the first divergence according to the difference value, wherein the first divergence may be in positive correlation with the first probability ratio. The server may calculate the ratio of the occurrence probability of the second distribution value to the occurrence probability of the corresponding second distribution value to obtain a second probability ratio, and determine the second divergence according to the second probability ratio, wherein the second divergence may be in positive correlation with the second probability ratio.

The degree of similarity between the first feature value distribution and the second feature value distribution may be in negative correlation with the target divergence, and therefore, by adjusting the target divergence to a reduction direction, the degree of similarity between the first feature value distribution and the second feature value distribution can be adjusted; and the greater the degree of similarity between the first feature value distribution and the second feature value distribution is, the less the image domain information contained in the first image feature and the second image feature is, and therefore, the effects of performing feature extraction on images and extracting image content features can be achieved. The second model loss value may be in positive correlation with the target divergence, and therefore, by adjusting the second model loss value to a reduction direction, it can also implementable that the image domain information contained in the first image feature and the second image feature may be less and less, and the effects of performing feature extraction on images and extracting image content features can be achieved.

In this example, the smaller the difference value is, the closer the first distribution value and the second distribution value are, and the more similar the first feature value distribution and the second feature value distribution are, and therefore the distribution correlation degree determined according to the difference value can accurately reflect the degree of similarity between the first feature value distribution and the second feature value distribution, and the accuracy of the distribution correlation degree may be improved.

In some examples, the first image feature may be obtained based on a first encoding model, the second image feature may be obtained based on a second encoding model, and the step that model parameters of the image processing model may be adjusted to a direction in which the target feature correlation degree may be increased and a direction in which the distribution correlation degree may be increased to obtain a trained image processing model includes: model parameters of the image processing model, the first encoding model and the second encoding model may be acquired to a direction in which the target feature correlation degree may be increased and a direction in which the distribution correlation degree may be increased to obtain an adjusted image processing model, first encoding model and second encoding model; the step that a first image belonging to a first image domain may be acquired may be returned so as to continue model training until the image processing model converges to obtain the trained image processing model.

Specifically, the server may adjust the model parameters of the image processing model, the first encoding model and the second encoding model to the direction in which the target model loss value may be reduced, and perform iterative training for many times until the image processing model converges to obtain a trained image processing model, a trained first encoding model and a trained second encoding model.

In some examples, when a model convergence condition may be satisfied, it may be determined that the model converges. The model convergence condition may be that the change of the model loss value may be less than a change value of a preset loss value, or may be that the change of the model parameters may be less than a change value of a preset parameter. The change value of the preset loss value and the change value of the preset parameter may be preset.

In some examples, the server may perform back-propagation based on the target model loss value, and update the model parameters of the image processing model, the first encoding model and the second encoding model in a gradient descent direction during the back-propagation. Back means that the update of the parameters and image processing may be performed in opposite directions. The gradient descent method may be a random gradient descent method or a batch gradient descent method.

In some examples, the target model loss value may include a first model loss value and a second model loss value, and the server may adjust the model parameters of the image processing model, the first encoding model and the second encoding model to a direction in which the first model loss value may be reduced and a direction in which the second model loss value may be reduced to obtain the trained image processing model, first encoding model and second encoding model.

In some examples, the server makes the first model loss value change to a reduction direction by adjusting the parameters of the feature discrimination model and the image processing model; since the first feature discrimination probability may be in negative correlation with the first model loss value and the second feature discrimination probability may be in positive correlation with the first model loss value, the first feature discrimination probability can be made to change to an increment direction and the second feature discrimination probability can be made to change to a reduction direction; and since the mutual information of the first image feature and the second image feature may be in positive correlation with the first feature discrimination probability, the mutual information of the first image feature and the second image feature may change to an increment direction, so that the mutual information of the first image feature and the second image feature may be maximized. By adjusting the second model loss value to the reduction direction, the effects of performing feature extraction on images and extracting image content features can be achieved, that is, the first image feature and the second image feature can only include the image content features; and in a case that the image features only include the image content features, the mutual information of a content feature of the first image and a content feature of the second image may be maximized, so that the content feature of the second image can be kept consistent with the content feature of the first image, then, the situation that the second image obtained by the image processing model deforms may be reduced, and the accuracy of image processing model and the image processing effect may be improved.

In some examples, when the image processing model may be the generative network model in the generative adversarial network, the server may jointly train the feature discrimination model, the first encoding model, the second encoding model as well as the generative network model and the discrimination network model in the generative adversarial network based on the target model loss value, and perform iterative training for a plurality of times, such as 70 times, to obtain each trained model.

In this example, joint training for the image processing model, the first encoding model and the second encoding model may be achieved, the accuracy of the model and the model training efficiency may be improved, and the accuracy of domain adaptation may be improved.

Figure 7:
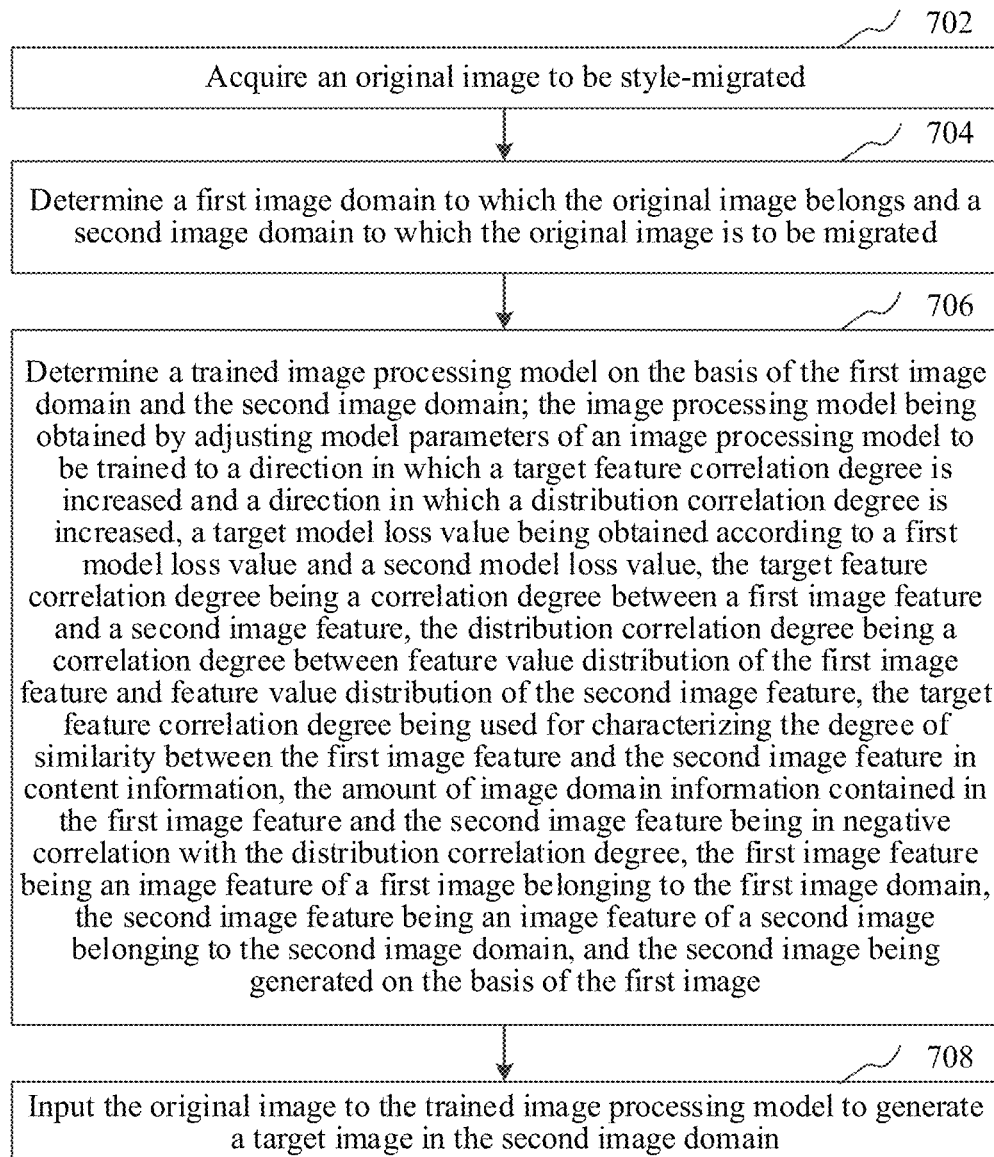
FIG. 7 is a schematic flowchart of an image processing method in some examples.

In some examples, as shown in FIG. 7, an image processing method may be provided, and the method may be described by way of an example in which the method may be applied to the terminal 102 in FIG. 1, and may include the following steps.

Step 702, an original image to be style-migrated may be acquired.

Step 704, a first image domain to which the original image belongs and a second image domain to which the original image may be to be migrated may be determined.

Step 706, a trained image processing model may be determined based on the first image domain and the second image domain; the image processing model may be obtained by adjusting model parameters of an image processing model to be trained to a direction in which a target feature correlation degree may be increased and a direction in which a distribution correlation degree may be increased, the target feature correlation degree may be a correlation degree between a first image feature and a second image feature, the distribution correlation degree may be a correlation degree between feature value distribution of the first image feature and feature value distribution of the second image feature, the target feature correlation degree may be used for characterizing the degree of similarity between the first image feature and the second image feature in content information, and the amount of image domain information contained in the first image feature and the second image feature may be in negative correlation with the distribution correlation degree; the first image feature may be an image feature of a first image belonging to the first image domain, the second image feature may be an image feature of a second image belonging to the second image domain, and the second image may be generated based on the first image.

Step 708, the original image may be input to the trained image processing model to generate a target image in the second image domain.

The original image may be an image to be style-migrated. The original image belongs to the first image domain. The trained image processing model may be used for converting an image in the first image domain into an image in the second image domain, thereby achieving image domain migration. The target image may be generated by the trained image processing model according to the original image, and the target image belongs to the second image domain.

In the above-mentioned image processing method, the original image to be style-migrated may be acquired, the first image domain to which the original image belongs and the second image domain to which the original image to be migrated may be determined, and the trained image processing model may be determined based on the first image domain and the second image domain; the image processing model may be obtained by adjusting the model parameters of the image processing model to be trained to the direction in which the target feature correlation degree may be increased and the direction in which the distribution correlation degree may be increased, the target feature correlation degree may be the correlation degree between the first image feature and the second image feature, the distribution correlation degree may be the correlation degree between the feature value distribution of the first image feature and the feature value distribution of the second image feature, the first image feature may be the image feature of the first image belonging to the first image domain, the second image feature may be the image feature of the second image belonging to the second image domain, the second image may be generated based on the first image, and the original image may be input to the trained image processing model to generate the target image in the second image domain. The amount of image domain information contained in the first image feature and the second image feature may be in negative correlation with the distribution correlation degree, the greater the distribution correlation degree is, the less the information relevant to the image domain in the first image feature and the second image feature is, and therefore, by adjusting the model parameters to the direction in which the distribution correlation degree may be increased, the image domain information in the first image feature and the second image feature can be reduced, and the information in the first image feature and the second image feature may be mainly the image content information. The target feature correlation degree may be used for characterizing the degree of similarity between the first image and the second image in content information, the greater the target feature correlation degree is, the greater the degree of similarity between the first image feature and the second image feature in content information is, and therefore, by adjusting the model parameters to the direction in which the target feature correlation degree may be increased, the second image feature and the first image feature can be kept consistent in content information, the situation that the generated second image deforms can be reduced, and then, the deformation of the image can be reduced when the trained image processing model performs image domain conversion. Therefore, the original image may be processed by the trained image processing model to generate the target image in the second image domain, which improves the accuracy of the image processing model and the image processing effect.

The image processing method provided in the present subject matter can be used for processing medical images in the medical field. When an image detection model in the medical field may be trained, the image detection model may be a model for detecting an image and may be used for obtaining an image detection result, and the image detection result may, for example, be a detection result of an object in the image, for example, including at least one of a position where the object may be located and a classification result corresponding to the object. For example, an image recognition model may perform recognition to obtain at least one of the position and class of a spot in the fundus.

There may be often a case that images in a training set may be acquired by one medical device, and medical images in a test set of a test image detection model may be acquired by another medical device. Since each device adopts a different photographing parameter, the medical images in the training set and the medical images in the test set belong to different image domains; and when the image domains of the test set and the training set may be different, a result obtained using the test set to perform accuracy detection on the trained image detection model may be inaccurate. In order to solve this problem, the image processing method provided in the present subject matter can be adopted for training to obtain an image domain conversion model, and then, the trained image domain conversion model can convert the medical images in the test set to an image domain corresponding to the training set, so that the converted image domain of the test set may be consistent with the image domain of the training set, and the contents of the converted medical images may be kept consistent with those of the medical images which may not be converted, that is, the contents do not deform, for example, when the medical images may be fundus images, the fundi of the converted images and the images which may not be converted may be consistent. Then, the image detection model may be detected by the converted test set, so that the detection accuracy may be improved.

Specifically, a medical image corresponding to a test domain may be acquired to obtain a first image, and the first image may be input to an image domain conversion model to be trained to obtain a second image corresponding to a training domain, the test domain refers to an image domain corresponding to the test set, and the training domain refers to an image domain corresponding to the training set; first feature value distribution of a first image feature corresponding to the first image and second feature value distribution of a second image feature corresponding to the second image may be determined; and model parameters of the image domain conversion model may be adjusted to a direction in which the difference of the first image feature and the second image feature may be reduced and a direction in which the difference of the first feature value distribution and the second feature value distribution may be reduced to obtain a trained image domain conversion model, the trained image domain conversion model can convert a medical image belonging to a test set domain into a medical image belonging to a training set domain, and can reduce the situation that contents in the converted medical image change, thereby improving the processing effect of the medical image. Therefore, the trained image domain conversion model can be used to perform domain conversion on the medical images in the test set to obtain a converted test set, so that the medical images in the converted test set belong to the training image domain, and the contents do not deform. Using the converted test set to test the image detection model can improve the accuracy of the test.

The trained image processing model obtained using the image processing method provided in the present subject matter can also be used for performing image domain conversion on an image, so that an image domain corresponding to a domain-converted image may be matched with an image domain corresponding to the image detection model. For example, the image detection model may be obtained by training using a training set in a second image domain, and therefore, in order to improve the detection accuracy of the image detection model for an image to be detected, image domains of images to be detected from different hospitals or different medical devices can be converted into the second image domain, then, images in the second image domain may be input to the image detection model for detection, and thus, the detection accuracy may be improved.

Figure 8:
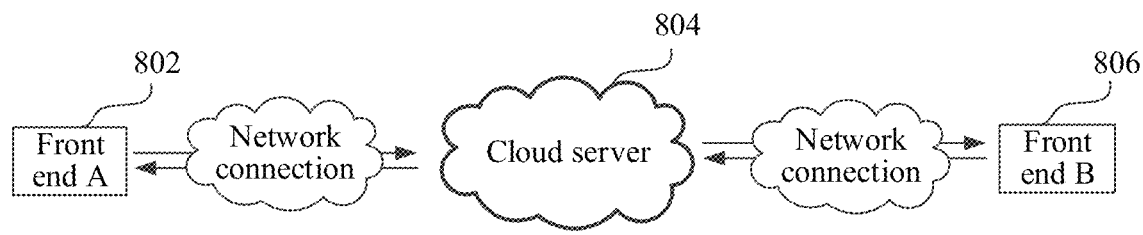
FIG. 8 is a diagram of an application environment of an image processing method in some examples.

As shown in FIG. 8, a diagram of an application scene of the image processing method provided in some examples may be shown. A trained image processing model may be deployed in a cloud server, a front end A802 may send an image to be subjected to image domain conversion to the cloud server 804, the cloud server may acquire the image to be subjected to image domain conversion, and image domain conversion may be performed on the image to be subjected to image domain conversion using the image processing method provided in the present subject matter to obtain an image subjected to image domain conversion. The cloud server 804 may send the image subjected to image domain conversion to a front end B806, or an image detection model may also be deployed in the cloud server 804, and image detection may be performed on the image subjected to image domain conversion using the image detection model to obtain an image detection result, and then, the image detection result may be sent to the front end B. The front end B may, for example, be a computer or a cell phone, and the front end A may be an image acquisition device. It can be understood that front end A and the front end B may be the same device or different devices.

For example, the front end A may be an image acquisition device for performing image acquisition on the fundus; an image detection model needs to detect images from different hospitals or different image acquisition devices; after acquiring a fundus image, an image acquisition device may send the fundus image to the cloud server; an image processing model and an image detection model may be deployed on the cloud server; the image detection model may be obtained by performing training by adopting the image in the second image domain; and the image processing model may be obtained by performing training using the image processing method in the present subject matter and may be used for converting images in different image domains to the second image domain. Therefore, after receiving the fundus image, the cloud server may input the fundus image to the image processing model to perform image domain conversion so as to obtain the fundus image in the second image domain; the cloud server inputs the fundus image in the second image domain to the image detection model for detection so as to obtain an image detection result; the cloud server may send the image detection result to the front end B such as a computer corresponding to a doctor or a detection person; and the front end B can display the image detection result.

Figure 9:
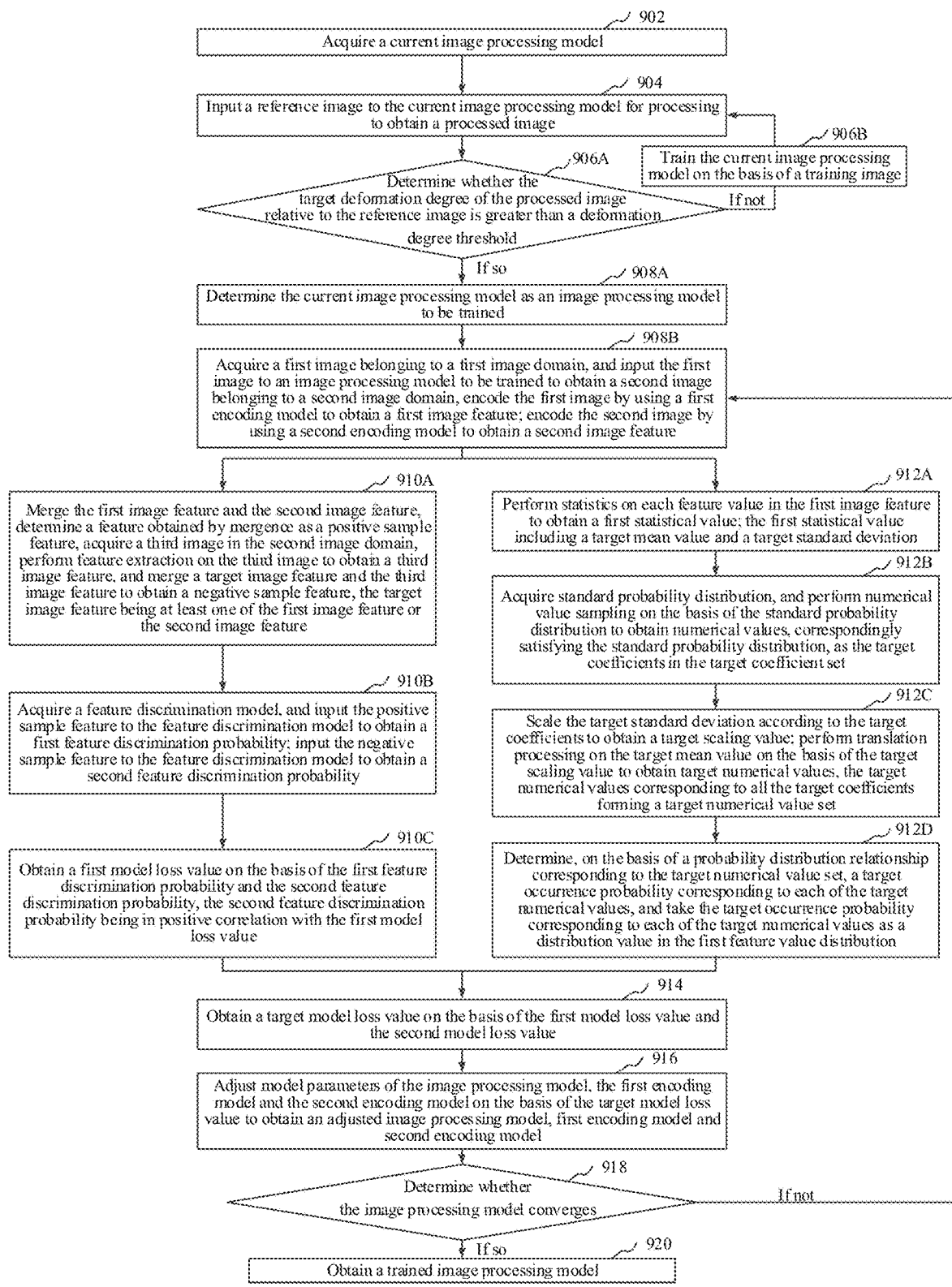
FIG. 9 is a schematic flowchart of an image processing method in some examples.

In some examples, as shown in FIG. 9, provided may be an image processing method including the following steps.

902, a current image processing model may be acquired.

904, a reference image may be input to the current image processing model for processing to obtain a processed image.

906A, it may be determined whether a target deformation degree of the processed image relative to the reference image may be greater than a deformation degree threshold, if so, skip to 908A, and if not, skip to 906B.

906B, the current image processing model may be trained based on a training image, and the step 904 may be returned.

908A, the current image processing model may be determined as an image processing model to be trained.

908B, a first image belonging to a first image domain may be acquired, the first image may be input to an image processing model to be trained to obtain a second image belonging to a second image domain, and the first image may be encoded using a first encoding model to obtain a first image feature; and the second image may be encoded using a second encoding model to obtain a second image feature.

910A, the first image feature and the second image feature may be merged, a feature obtained by mergence may be taken as a positive sample feature, a third image in the second image domain may be acquired, feature extraction may be performed on the third image to obtain a third image feature, a target image feature and the third image feature may be merged to obtain a negative sample feature, and the target image feature may be at least one of the first image feature and the second image feature;

wherein the third image may be different from the second image; and the target image feature may be any one of the first image feature and the second image feature.

910B, a feature discrimination model may be acquired, and the positive sample feature may be input to the feature discrimination model to obtain a first feature discrimination probability; and the negative sample feature may be input to the feature discrimination model to obtain a second feature discrimination probability.

910C, a first model loss value may be obtained based on the first feature discrimination probability and the second feature discrimination probability, wherein the second feature discrimination probability may be in positive correlation with the first model loss value.

912A, statistics may be performed on each feature value in the first image feature to obtain a first statistical value; the first statistical value may include a target mean value and a target standard deviation.

912B, standard probability distribution may be acquired, and numerical value sampling may be performed based on the standard probability distribution to obtain numerical values, correspondingly satisfying the standard probability distribution, as the target coefficients in the target coefficient set.

912C, the target standard deviation may be scaled according to the target coefficients to obtain a target scaling value; translation processing may be performed on the target mean value based on the target scaling value to obtain target numerical values, wherein the target numerical values corresponding to all the target coefficients form a target numerical value set.

912D, a target occurrence probability corresponding to each of the target numerical values may be determined based on a probability distribution relationship corresponding to the target numerical value set, and the first feature value distribution may be obtained according to the target occurrence probability corresponding to each target numerical value;

wherein the target occurrence probability corresponding to each target numerical value can be determined as distribution in the first feature value distribution.

914, a target model loss value may be obtained based on the first model loss value and the second model loss value.

916, model parameters of the image processing model, the first encoding model and the second encoding model may be adjusted based on the target model loss value to obtain an adjusted image processing model, first encoding model and second encoding model.

918, it may be determined whether the image processing model converges, and if not, the step 908B may be returned to continue the model training, and if so, step 920 may be performed.

920, the trained image processing model may be obtained.

Steps 910A-910C and steps 912A-912D may be performed in parallel.

Steps in flowcharts of the foregoing examples may be displayed in sequence based on indication of arrows, but the steps may not be necessarily performed in sequence based on a sequence indicated by the arrows. Unless otherwise explicitly specified in this specification, execution of the steps may not be strictly limited, and the steps may be performed in other sequences. In addition, at least some steps in the foregoing examples may include a plurality of steps or a plurality of stages, and these steps or stages may not be necessarily performed at a same time instant, but may be performed at different time instants. The steps or stages may not be necessarily performed in sequence, but may be performed by turn or alternately with other steps or at least part of steps or stages in other steps.

Figure 10:
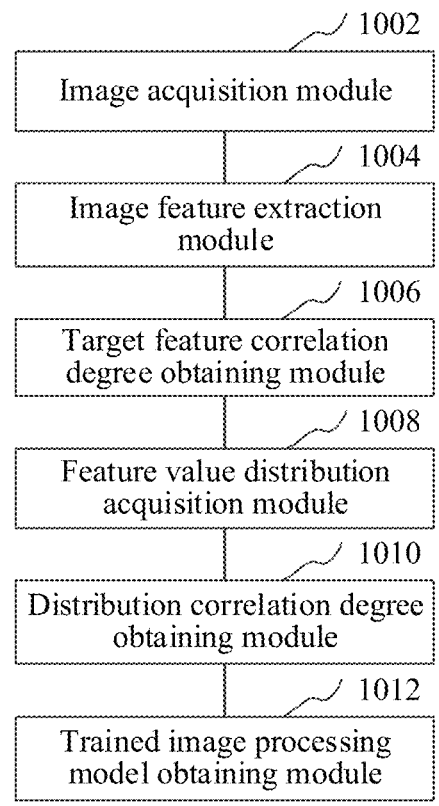
FIG. 10 is a structural block diagram of an image processing apparatus in some examples.

In some examples, as shown in FIG. 10, an image processing apparatus may be provided. The apparatus may adopt a software module or a hardware module, or a combination of the both to form a part of a computer device. The apparatus specifically includes: an image acquisition module 1002, an image feature extraction module 1004, a target feature correlation degree obtaining module 1006, a feature value distribution acquisition module 1008, a distribution correlation degree obtaining module 1010, and a trained image processing model obtaining module 1012, wherein: the image acquisition module 1002 may be configured to acquire a first image belonging to a first image domain, and input the first image to an image processing model to be trained to obtain a second image belonging to a second image domain. The image feature extraction module 1004 may be configured to perform feature extraction on the first image to obtain a first image feature, and perform feature extraction on the second image to obtain a second image feature. The target feature correlation degree obtaining module 1006 may be configured to calculate a correlation degree between the first image feature and the second image feature to obtain a target feature correlation degree, wherein the target feature correlation degree may be used for characterizing the degree of similarity between the first image feature and the second image feature in content information. The feature value distribution acquisition module 1008 may be configured to acquire feature value distribution of the first image feature to obtain first feature value distribution, and acquire feature value distribution of the second image feature to obtain second feature value distribution. The distribution correlation degree obtaining module 1010 may be configured to calculate a correlation degree between the first feature value distribution and the second feature value distribution to obtain a distribution correlation degree, wherein the amount of image domain information contained in the first image feature and the second image feature may be in negative correlation with the distribution correlation degree. The trained image processing model obtaining module 1012 may be configured to adjust model parameters of the image processing model to a direction in which the target feature correlation degree may be increased and a direction to which the distribution correlation degree may be increased to obtain a trained image processing model, so that an image may be processed using the trained image processing model.

In some examples, the feature value distribution acquisition module 1008 includes: a first statistical value obtaining unit configured to perform statistics on each feature value in the first image feature to obtain a first statistical value; and a first statistical value distribution determination unit configured to determine the feature value distribution of the first image feature according to the first statistical value to obtain the first feature value distribution.

In some examples, the first statistical value may include a target mean value and a target standard deviation, and the first statistical value distribution determination unit may be further configured to obtain a target coefficient set, wherein the target coefficient set may include a plurality of target coefficients; scale the target standard deviation according to the target coefficients to obtain a target scaling value; perform translation processing on the target mean value based on the target scaling value to obtain target numerical values, wherein the target numerical values corresponding to all the target coefficients form a target numerical value set; determine a target occurrence probability corresponding to each of the target numerical values based on a probability distribution relationship corresponding to the target numerical value set, wherein the probability distribution relationship may be distribution to which the numerical values in the target numerical value set conform; and determine the target occurrence probability corresponding to each target numerical value as a distribution value in the first feature value distribution.

In some examples, the first statistical value distribution determination unit may be further configured to acquire standard probability distribution, and perform numerical value sampling based on the standard probability distribution to obtain numerical values, correspondingly satisfying the standard probability distribution, as the target coefficients in the target coefficient set.

In some examples, the target feature correlation degree may include a first feature discrimination probability, and the target feature correlation degree obtaining module 1006 includes: a positive sample feature obtaining unit configured to merge the first image feature and the second image feature, and determine the merged feature as a positive sample feature; and a first feature discrimination probability obtaining unit configured to acquire a feature discrimination model, and input a positive sample feature to the feature discrimination model to obtain a first feature discrimination probability. The trained image processing model obtaining module 1012 includes: a first model loss value obtaining unit configured to obtain a first model loss value based on the first feature discrimination probability; the first feature discrimination probability being in negative correlation with the first model loss value; a second model loss value obtaining unit configured to obtain a second model loss value based on the distribution correlation degree, the second model loss value being in negative correlation with the distribution correlation degree. a first model parameter adjustment unit configured to adjust model parameters of the image processing model based on the first model loss value and the second model loss value to obtain a trained image processing model.

In some examples, the apparatus may be further configured to acquire a third image in the second image domain, the third image being different from the second image; perform feature extraction on the third image to obtain a third image feature; obtain a negative sample feature based on the target image feature and the third image feature, input the negative sample feature to the feature discrimination model to obtain a second feature discrimination probability, wherein the target image feature may be the first image feature or the second image feature; the first model loss value obtaining unit may be further configured to obtain the first model loss value based on the first feature discrimination probability and the second feature discrimination probability, wherein the second feature discrimination probability may be in positive correlation with the first model loss value.

In some examples, the apparatus further includes: a model parameter adjustment gradient obtaining module configured to obtain a model parameter adjustment gradient corresponding to the feature discrimination model based on the first model loss value; and a parameter adjustment module configured to adjust the model parameters of the gradient adjustment feature discrimination model based on the model parameters.

In some examples, the apparatus further includes: a current image processing model acquisition module configured to acquire a current image processing model; a processed image obtaining module configured to input a reference image to a current image processing model for processing to obtain a processed image; a target deformation degree determination module configured to determine a deformation degree of the processed image relative to the reference image to obtain a target deformation degree; a judgement module configured to, when it may be determined that the target deformation degree may be greater than the deformation degree threshold, determine the current image processing model as an image processing model to be trained, and enter the step that the first image belonging to the first image domain may be acquired, otherwise, train the current image processing model based on a training image, and return to the step that a reference image may be input to the current image processing model for processing.

In some examples, the distribution correlation degree obtaining module 1010 includes: a distribution value acquisition unit configured to acquire a first distribution value from first feature value distribution and acquire a second distribution value corresponding to the first distribution value from second feature value distribution; a difference value acquisition unit configured to perform difference calculation on the first distribution value and the second distribution value to obtain a difference value; and a distribution correlation degree determination unit configured to determine a distribution correlation degree based on the difference value, the distribution correlation degree being in negative correlation with the difference value.

In some examples, the first image feature may be obtained based on a first encoding model, the second image feature may be obtained based on a second encoding model, and the trained image processing model obtaining module 1012 includes: a second model parameter adjustment unit configured to adjust model parameters of the image processing model, the first encoding model and the second encoding model to a direction in which the target feature correlation degree may be increased and a direction in which the distribution correlation degree may be increased to obtain an adjusted image processing model, first encoding model and second encoding model; and a trained image processing model obtaining unit configured to return to the step that a first image belonging to a first image domain may be acquired to continue model training until the image processing model converges to obtain a trained image processing model.

Figure 11:
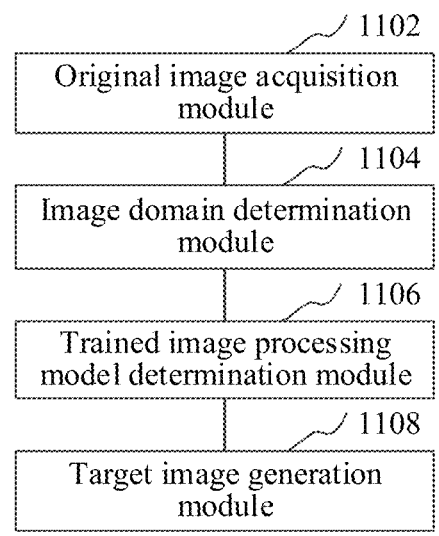
FIG. 11 is a structural block diagram of an image processing apparatus in some examples.

In some examples, as shown in FIG. 11, an image processing apparatus may be provided. the apparatus may adopt a software module or a hardware module, or a combination of the both to form a part of a computer device. The apparatus specifically includes: an original image acquisition module 1102, an image domain determination module 1104, a trained image processing model determination module 1106, and a target image generation module 1108, wherein: the original image acquisition module 1102 may be configured to acquire an original image to be style-migrated. The image domain determination module 1104 may be configured to determine a first image domain to which the original image belongs and a second image domain to which the original image may be to be migrated. The trained image processing model determination module 1106 may be configured to determine a trained image processing model based on the first image domain and the second image domain; the image processing model may be obtained by adjusting model parameters of an image processing model to be trained to a direction in which a target feature correlation degree may be increased and a direction in which a distribution correlation degree may be increased, the target feature correlation degree may be a correlation degree between a first image feature and a second image feature, the distribution correlation degree may be a correlation degree between feature value distribution of the first image feature and feature value distribution of the second image feature, the target feature correlation degree may be used for characterizing the degree of similarity between the first image feature and the second image feature in content information, and the amount of image domain information contained in the first image feature and the second image feature may be in negative correlation with the distribution correlation degree; the first image feature may be an image feature of a first image belonging to the first image domain, the second image feature may be an image feature of a second image belonging to the second image domain, and the second image may be generated based on the first image. The target image generation module 1108 may be configured to input the original image to the trained image processing model to generate a target image in the second image domain.

For a specific limitation on the image processing apparatus, refer to the limitation on the image processing method above. Details may not be described herein again. Each module in the foregoing image processing apparatus may be implemented in whole or in part by software, hardware, and combinations thereof. The foregoing modules may be built in or independent of a processor of a computer device in a hardware form, or may be stored in a memory of the computer device in a software form, so that the processor invokes and performs an operation corresponding to each of the foregoing modules.

The term module (and other similar terms such as unit, subunit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that may include the functionalities of the module.

In some examples, a computer device may be provided. The computer device may be a server, and an internal structure diagram thereof may be shown in FIG. 12. The computer device may include a processor, a memory, and a network interface that may be connected using a system bus. The processor of the computer device may be configured to provide computing and control capabilities. The memory of the terminal may include a non-transitory storage medium and an internal memory. The non-transitory storage medium stores an operating system, a computer-readable instruction, and a database. The internal memory provides an environment for running of the operating system and the computer-readable instruction in the non-transitory storage medium. The database of the computer device may be configured to store data related to the image processing method. The network interface of the computer device may be configured to communicate with an external terminal through a network connection. The computer-readable instruction may be executed by the processor to implement the image processing method.

In some examples, a computer device may be provided. The computer device may be a terminal, and an internal structure diagram thereof may be shown in FIG. 13. The computer device may include a processor, a memory, a communication interface, a display screen, and an input apparatus that may be connected using a system bus. The processor of the computer device may be configured to provide computing and control capabilities. The memory of the computer device may include a non-transitory storage medium and an internal memory. The non-transitory storage medium stores an operating system and a computer-readable instruction. The internal memory provides an environment for running of the operating system and the computer-readable instruction in the non-transitory storage medium.

The communication interface of the computer device may be configured to communicate with an external terminal in a wired or a wireless manner, and the wireless manner can be implemented using WIFI, an operator network, NFC, or other technologies. The computer-readable instruction may be executed by the processor to implement the image processing method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 12:
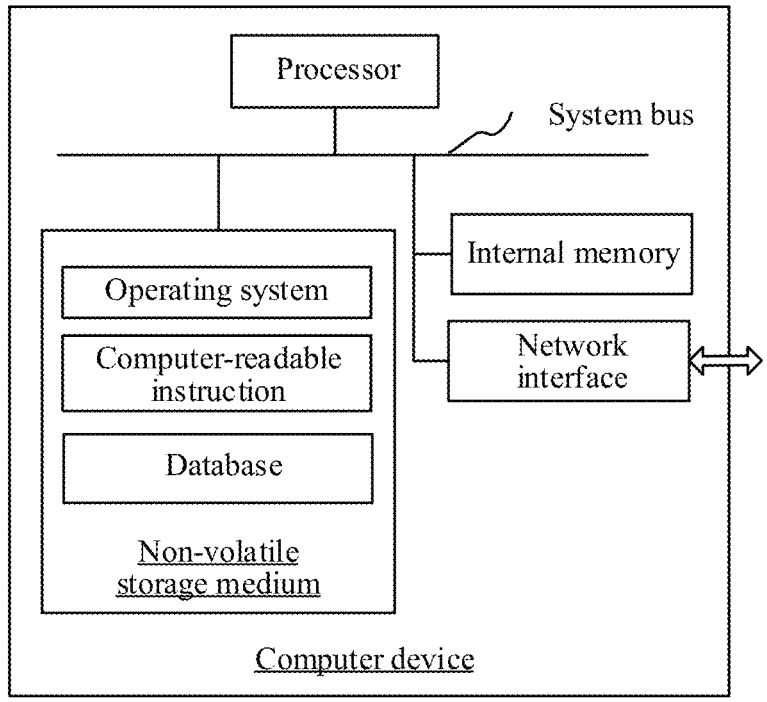
FIG. 12 is an internal structural diagram of a computer device in some examples.
Figure 13:
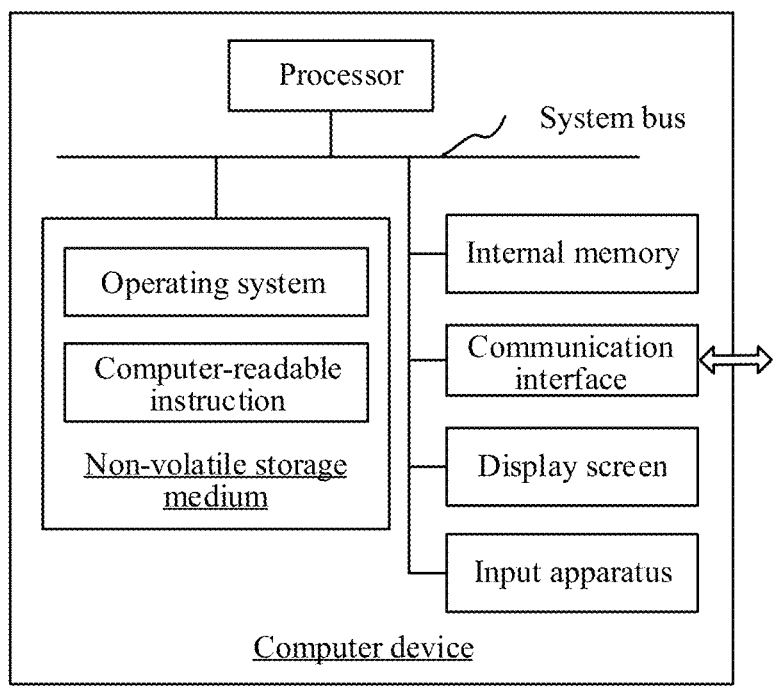
FIG. 13 is an internal structural diagram of a computer device in some examples.

A person skilled in the art may understand that, the structure shown in FIG. 12 and FIG. 13 may be only a block diagram of a part of a structure related to a solution of the present subject matter and does not limit the computer device to which the solution of the present subject matter may be applied. Specifically, the computer device may include more or fewer components than those in the drawings, or some components may be combined, or a different component deployment may be used.

In some examples, a computer device may be further provided, including a memory and one or more processors. The memory stores computer readable instructions, the computer readable instructions, when executed by the processors, causing the one or more processors to perform the steps of the various method examples described above.

In some examples, one or more computer-readable storage media may be provided, storing computer-readable instructions, the computer-readable instructions, when executed by one or more processors, causing the one or more processors to perform the steps of the various method examples described above.

In some examples, a computer program product may be further provided, storing computer-readable instructions, the computer-readable instructions, when executed by a processor, implementing the steps in the foregoing method examples.

A person of ordinary skill in the art may understand that all or some of the procedures of the methods of the foregoing examples may be implemented by computer-readable instructions instructing relevant hardware. The computer-readable instructions may be stored in a non-transitory computer-readable storage medium. When the computer-readable instructions may be executed, the procedures of the examples of the foregoing methods may be included. Any reference to a memory, a storage, a database, or another non-transitory medium used in the examples provided in the present subject matter may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM may be available in a plurality of forms, such as a static RAM (SRAM) or a dynamic RAM (DRAM).

The technical features in the foregoing examples may be randomly combined. For concise description, not all possible combinations of the technical features in the example may be described. However, provided that combinations of the technical features do not conflict with each other, the combinations of the technical features may be considered as falling within the scope recorded in this specification.

The foregoing examples only describe several implementations of the present subject matter specifically and in detail, but cannot be construed as a limitation to the patent scope of the present subject matter. It should be noted that a person of ordinary skill in the art may make various changes and improvements without departing from the ideas of the present subject matter, which shall all fall within the protection scope of the present subject matter. Therefore, the protection scope of this patent application may be subject to the protection scope of the appended claims.

The invention claimed is:

1. A method performed by a computer device, comprising:
acquiring a first image belonging to a first image domain;
inputting the first image to an image processing model to be trained to obtain a second image belonging to a second image domain;
performing feature extraction on the first image to obtain a first image feature;
performing feature extraction on the second image to obtain a second image feature;
calculating a first correlation degree between the first image feature and the second image feature to obtain a target feature correlation degree, wherein
the target feature correlation degree is used for characterizing a degree of similarity between the first image feature and the second image feature in content information;
acquiring feature value distribution of the first image feature to obtain first feature value distribution;
acquiring feature value distribution of the second image feature to obtain second feature value distribution;
calculating a second correlation degree between the first feature value distribution and the second feature value distribution to obtain a distribution correlation degree, wherein
an amount of image domain information contained in the first image feature and the second image feature are in negative correlation with the distribution correlation degree; and
adjusting model parameters of the image processing model to a direction in which the target feature correlation degree is increased and a direction in which the distribution correlation degree is increased to obtain a trained image processing model, wherein the adjusting keeps the first image feature and the second image feature consistent in content information.

2. The method according to claim 1, wherein
the acquiring feature value distribution of the first image feature to obtain first feature value distribution comprises:
performing statistics on each feature value in the first image feature to obtain a first statistical value; and
determining the feature value distribution of the first image feature according to the first statistical value to obtain the first feature value distribution.

3. The method according to claim 2, wherein
the first statistical value comprises a target mean value and a target standard deviation, and
the determining the feature value distribution of the first image feature according to the first statistical value to obtain the first feature value distribution comprises:
acquiring a target coefficient set, the target coefficient set comprising a plurality of target coefficients;
scaling the target standard deviation according to the target coefficients to obtain a target scaling value;
performing translation processing on the target mean value based on the target scaling value to obtain target numerical values, wherein the target numerical values corresponding to all the target coefficients form a target numerical value set;

determining, based on a probability distribution relationship corresponding to the target numerical value set, a target occurrence probability corresponding to each of the target numerical values, wherein the probability distribution relationship is a distribution to which the numerical values in the target numerical value set conform; and determining the target occurrence probability corresponding to each of the target numerical values as a distribution value in the first feature value distribution.

4. The method according to claim 3, wherein the operation of acquiring a target coefficient set comprises:

acquiring standard probability distribution, and performing numerical value sampling based on the standard probability distribution to obtain numerical values that correspondingly satisfy the standard probability distribution as the target coefficients in the target coefficient set.

5. The method according to claim 1, wherein the target feature correlation degree comprises a first feature discrimination probability, and the operation of calculating the first correlation degree between the first image feature and the second image feature to obtain a target feature correlation degree comprises:

merging the first image feature and the second image feature, and determining a feature obtained mergence as a positive sample feature;

acquiring a feature discrimination model; and inputting the positive sample feature to the feature discrimination model to obtain a first feature discrimination probability, wherein the adjusting model parameters of the image processing model to a direction in which the target feature correlation degree is increased, and the direction in which the distribution correlation degree is increased to obtain a trained image processing model comprises:

obtaining a first model loss value based on the first feature discrimination probability; the first feature discrimination probability is in negative correlation with the first model loss value;

obtaining a second model loss value based on the distribution correlation degree, the second model loss value is in negative correlation with the distribution correlation degree; and adjusting the model parameters of the image processing model based on the first model loss value and the second model loss value to obtain the trained image processing model.

6. The method according to claim 5, further comprising:

acquiring a third image in the second image domain, the third image is different from the second image;

performing feature extraction on the third image to obtain a third image feature;

obtaining a negative sample feature based on the target image feature and the third image feature;

inputting the negative sample feature to the feature discrimination model to obtain a second feature discrimination probability, wherein the target image feature is the first image feature or the second image feature; and the operation of obtaining a first model loss value based on the first feature discrimination probability comprises:

obtaining the first model loss value based on the first feature discrimination probability and the second feature discrimination probability, wherein the second feature discrimination probability is in positive correlation with the first model loss value.

7. The method according to claim 6, further comprising:

obtaining a model parameter adjustment gradient corresponding to the feature discrimination model based on the first model loss value; and adjusting model parameters of the feature discrimination model based on the model parameter adjustment gradient.

8. The method according to claim 1, further comprising:

acquiring a current image processing model;

inputting a reference image to the current image processing model for processing to obtain a processed image, wherein the reference image belongs to the first image domain; and determining a deformation degree of the processed image relative to the reference image to obtain a target deformation degree, wherein in a case that it is determined that the target deformation degree is greater than a deformation degree threshold:

determining the current image processing model as an image processing model to be trained, entering the operation of acquiring a first image belonging to a first image domain; otherwise, training the current image processing model based on a training image, and returning to the operation of inputting a reference image to the current image processing model for processing, wherein the training image belongs to the first image domain.

9. The method according to claim 1, wherein the operation of calculating the second correlation degree between the first feature value distribution and the second feature value distribution to obtain a distribution correlation degree comprises:

acquiring a first distribution value from the first feature value distribution;

acquiring a second distribution value corresponding to the first distribution value from the second feature value distribution;

performing difference calculation on the first distribution value and the second distribution value to obtain a difference value; and determining the distribution correlation degree based on the difference value, wherein the distribution correlation degree is in negative correlation with the difference value.

10. The method according to claim 1, wherein the first image feature is obtained based on a first encoding model, the second image feature is obtained based on a second encoding model, and the operation of adjusting model parameters of the image processing model to a direction in which the target feature correlation degree is increased and a direction in which the distribution correlation degree is increased to obtain a trained image processing model comprises:

adjusting model parameters of the image processing model, the first encoding model and the second encoding model to a direction in which the target feature correlation degree is increased and a direction in which the distribution correlation degree is increased to obtain an adjusted image processing model, first encoding model, and second encoding model; and returning to the operation of acquiring a first image belonging to a first image domain to continue model training until the image processing model converges to obtain the trained image processing model.

11. An image processing method, performed by a computer device, the method comprising:

acquiring an original image to be style-migrated;

determining a first image domain to which the original image belongs and a second image domain to which the original image is to be migrated;

determining a trained image processing model based on the first image domain and the second image domain, wherein the image processing model is obtained by adjusting model parameters of an image processing model to be trained to a direction in which a target feature correlation degree is increased and a direction in which a distribution correlation degree is increased, wherein the adjusting keeps the first image feature and the second image feature consistent in content information, the target feature correlation degree is a correlation degree between a first image feature and a second image feature, the distribution correlation degree is a correlation degree between feature value distribution of the first image feature and feature value distribution of the second image feature, the target feature correlation degree is used for characterizing a degree of similarity between the first image feature and the second image feature in content information, an amount of image domain information contained in the first image feature and the second image feature is in negative correlation with the distribution correlation degree, the first image feature is an image feature of a first image belonging to the first image domain, the second image feature is an image feature of a second image belonging to the second image domain, and the second image is generated based on the first image; and inputting the original image to the trained image processing model to generate a target image in the second image domain.

12. An image processing apparatus comprising:

a processor;

a memory in communication with the processor, the memory storing a plurality of instructions executable by the processor to cause the image processing apparatus to:

acquire a first image belonging to a first image domain, and input the first image to an image processing model to be trained to obtain a second image belonging to a second image domain;

perform feature extraction on the first image to obtain a first image feature, and perform feature extraction on the second image to obtain a second image feature;

calculate a first correlation degree between the first image feature and the second image feature to obtain a target feature correlation degree, wherein the target feature correlation degree is used for characterizing a degree of similarity between the first image feature and the second image feature in content information;

acquire feature value distribution of the first image feature to obtain first feature value distribution, and acquire feature value distribution of the second image feature to obtain second feature value distribution;

calculate a second correlation degree between the first feature value distribution and the second feature value distribution to obtain a distribution correlation degree, wherein an amount of image domain information contained in the first image feature and the second image feature is in negative correlation with the distribution correlation degree; and adjust model parameters of the image processing model to a direction in which the target feature correlation degree is increased and a direction in which the distribution correlation degree is increased to obtain a trained image processing model, wherein the adjusting keeps the first image feature and the second image feature consistent in content information.

13. The apparatus according to claim 12, wherein the processor, when being configured to acquire feature value distribution of the first image feature to obtain first feature value distribution, and acquire feature value distribution of the second image feature to obtain second feature value distribution, is configured to:

perform statistics on each feature value in the first image feature to obtain a statistical value; and determine the feature value distribution of the first image feature according to the statistical value to obtain the first feature value distribution.

14. The apparatus according to claim 13, wherein the statistical value comprises a target mean value and a target standard deviation, and wherein the processor, when being configured to determine the feature value distribution of the first image feature according to the statistical value to obtain the first feature value distribution, is further configured to obtain a target coefficient set, wherein the target coefficient set includes a plurality of target coefficients.

15. The apparatus according to claim 14, wherein the processor, when being configured to determine the feature value distribution of the first image feature according to the statistical value to obtain the first feature value distribution, is further configured to:

scale the target standard deviation according to the target coefficients to obtain a target scaling value; and perform translation processing on the target mean value based on the target scaling value to obtain target numerical values, wherein the target numerical values corresponding to the target coefficients form a set of target numerical values.

16. The apparatus according to claim 15, wherein the processor, when being configured to determine the feature value distribution of the first image feature according to the statistical value to obtain the first feature value distribution, is further configured to:

determine a target occurrence probability corresponding to each of the target numerical values based on a probability distribution relationship corresponding to the set of target numerical values, wherein the probability distribution relationship is a distribution to which the numerical values in the set of target numerical values conform.

17. An image processing apparatus comprising:

a processor; and a memory in communication with the processor, the memory storing a plurality of instructions executable by the processor to cause the image processing apparatus to:

acquire an original image to be style-migrated;

determine a first image domain to which the original image belongs and a second image domain to which the original image is to be migrated;

determine a trained image processing model based on the first image domain and the second image domain, wherein the image processing model is obtained by adjusting model parameters of an image processing model to be trained to a direction in which a target feature correlation degree is increased and a direction in which a distribution correlation degree is increased, wherein the adjusting keeps the first image feature and the second image feature consistent in content information, the target feature correlation degree is a first correlation degree between a first image feature and a second image feature, the distribution correlation degree is a second correlation degree between feature value distribution of the first image feature and feature value distribution of the second image feature, the target feature correlation degree is used for characterizing a degree of similarity between the first image feature and the second image feature in content information, an amount of image domain information contained in the first image feature, the second image feature is in negative correlation with the distribution correlation degree, the first image feature is an image feature of a first image belonging to the first image domain, the second image feature is an image feature of a second image belonging to the second image domain, and the second image is generated based on the first image, and input the original image to the trained image processing model to generate a target image in a second image domain.

18. A computer device, comprising:

one or more processors; and a memory in communication with the one or more processors, the memory storing computer-readable instructions executable by the one or more processors to configure the computer device to perform the method of claim 1.

19. A non-transitory computer-readable storage medium comprising computer-readable instructions operable, when execute by one or more computing systems, to cause the one or more computing systems to perform the method of claim 1.

* * * * *